(12) United States Patent
Isautier et al.

(10) Patent No.: US 9,794,092 B1
(45) Date of Patent: Oct. 17, 2017

(54) SYSTEMS AND METHODS FOR IDENTIFICATION AND DEMODULATION OF COMPLEX SIGNAL FORMATS

(71) Applicant: GEORGIA TECH RESEARCH CORPORATION, Atlanta, GA (US)

(72) Inventors: Pierre P. Isautier, Atlanta, GA (US); Stephen E. Ralph, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/076,399

(22) Filed: Mar. 21, 2016

Related U.S. Application Data

(60) Provisional application No. 62/135,472, filed on Mar. 19, 2015, provisional application No. 62/310,313, filed on Mar. 18, 2016.

(51) Int. Cl.
*H04B 10/60* (2013.01)
*H04L 27/00* (2006.01)
*H04B 10/61* (2013.01)
*H04J 14/06* (2006.01)

(52) U.S. Cl.
CPC ..... *H04L 27/0012* (2013.01); *H04B 10/6161* (2013.01); *H04B 10/6166* (2013.01); *H04J 14/06* (2013.01)

(58) Field of Classification Search
CPC .................... H04B 10/6161–10/6163
See application file for complete search history.

(56) References Cited

U.S. PATENT DOCUMENTS 6,804,309 B1 * 10/2004 Morelos-Zaragoza ............ H04L 27/0012
375/316
2014/0064723 A1 * 3/2014 Adles ................... H04B 10/616
398/25

OTHER PUBLICATIONS

X. Zhou et al., "High Spectral Efficiency 400 Gb/s Transmission Using PDM Time-Domain Hybrid 32-64 QAM and Training-Assisted Carrier Recovery", Journal of Lightwave Technology, vol. 31, No. 7, Apr. 2013.*

* cited by examiner

*Primary Examiner* — Shi K Li
(74) *Attorney, Agent, or Firm* — Troutman Sanders LLP; Ryan A. Schneider; Christopher C. Close, Jr.

(57) ABSTRACT

Systems and methods for identification and demodulation of complex signal formats are disclosed. In an example embodiment of the disclosed technology, a method includes identifying the signal's frame (or pattern) length, identifying the various modulation formats that compose the frame, determining the ratio of the various modulation formats in the frame, and determining the actual pattern arrangement in the frame. Further, a method can include comparing the determined arrangement to reference patterns to determine the complex signal format.

9 Claims, 24 Drawing Sheets

| Format | OOK | BPSK | QPSK |
|---|---|---|---|
| $|C_{4,0}|$ | ~0.56 | 2 | 1 |
| $C_{4,1}$ | 0 | -2 | 0 |
| $C_{4,2}$ | ~-0.72 | -2 | -1 |

SYSTEMS AND METHODS FOR IDENTIFICATION AND DEMODULATION OF COMPLEX SIGNAL FORMATS

CROSS REFERENCE TO RELATED APPLICATION

This application claims benefit under 35 U.S.C. §119(e) of U.S. Provisional Patent Application Nos. 62/135,472, filed Mar. 19, 2015, entitled "Time-Domain Hybrid Modulation Format Recognition Method for Autonomous Software-Defined Coherent Optical Receiver", and 62/310,313, filed Mar. 18, 2016, entitled "Autonomous Receivers for Next-Generation of High-Speed Optical Communication Networks," both of which are incorporated herein by reference as if set forth herein in its entirety.

BACKGROUND

Technological advances have succeeded in continuously reducing the cost of bandwidth, thus spurring the development of new sets of services and transmission technologies deployed alongside older ones, which has resulted in increased levels of heterogeneity in the telecommunication ecosystem. These technologically driven changes in the telecommunication industry have resulted in multiple challenges for communications service providers (CSPs). CSPs have to address the growing need for bandwidth, manage an increasingly heterogeneous network, and maintain the required quality of service (QoS) of its service portfolio, while remaining competitive and profitable.

High-data rate transmissions over optical fiber have demonstrated the undeniable superiority of optical communications in terms of capacity and reach. As a consequence, for data transmissions over few tens of megabits per second and over anything from hundreds of meters and upwards, optical fiber has become the preferred transmission medium, making fiber optics the de facto backbone of the telecommunications and data networking infrastructures. Additionally, optical networks have other advantages beyond contributing enormous capacities to the network. For example, optical networks can provide a common infrastructure over which a variety of services can be delivered. Further, optical networks can, to a certain degree, provide spatio-temporal flexibility in the delivery of bandwidth.

Similar to the telecommunication network as a whole, optical networks have grown more complex over time. Today, fiber-optic-usable bandwidth is extensively utilized based, at least in part, on improvements in spectral efficiency (SE). Because of uninterrupted development in high-speed electronics, advances in fiber optic network optical elements, and the use of advanced signaling techniques, optical communication systems have reached a state of greater signal waveform flexibility and higher single channel data rates that now exceed 200 Gb/s [4]. As a result, the next generation of fiber optic communication systems is leaning towards a larger degree of dynamic adaptability in reach, data rate, and spectral occupancy, thus shifting away from legacy single purpose transceivers.

But optical fiber communication networks have certain limitations. In particular, their lack of mobility and required intensive infrastructures present certain challenges. For example, deploying or redeploying optical fiber is costly, time-consuming, and can be problematic in certain environments such as highly urban areas or extreme geographical locations where infrastructure costs are significant or, in the worst case scenarios, practically impossible.

Conventional microwave radio technology provides a viable alternative to optical fiber communication networks because it is rapid to deploy and suited for mobile and remote environments. It is challenged, however, by the growing data demands of users.

Multi-gigabit wireless photonics enable bridging fiber optic and wireless networks in a seamless fashion via the interposition of a wireless gateway that enables the conversion of optical signals to electrical wireless signals and vice versa. This technology provides the maneuverability and capacity required in some applications since it retains the mobility and deployment ease of wireless while providing fiber optic equivalent capacities and latencies to fixed and mobile users within a coverage area. Accordingly, evolutions in fiber optic network optical elements, high-speed electronics, and the convergence of the optical-wireless network have and will continue to dramatically increase the network's heterogeneity as well as its complexity.

Managing greater heterogeneity and complexity for modern communication networks is feasible with the cooperation of an omniscient supervisory control layer, which ensures coordination between all elements of the network for smoother data transmission from one client site to another. Typically, these architectures require critical transmitter and/or channel information be available at the receiver. For example, to function effectively, such architectures depend on the receiver having maximum foreknowledge of a received signal's transmission parameters such as modulation format, symbol rate (i.e., baud rate or modulation rate), and carrier frequency, as well as the number of the multiplexed polarizations and the length of the signal's transmission over fiber and the type of fiber used in the transmission.

Time-domain hybrid modulation formats (TDHMFs), which can be highly variable, introduce additional challenges in modulation format recognition. As can be appreciated, TDHMFs offer tenability within a continuum of tradeoffs between capacity, spectral occupancy, and reach, but they also increase the complexity of traffic patterns, specifically in the case of transceivers. Generally, to demodulate a received TDHMF signal, the receiver requires knowledge not only of the transmission parameters but also parameters of the TDHMF, in particular, the pattern length, composing modulation formats, their ratio in the pattern, and the pattern arrangement in time.

But there are important situations where network elements are not properly synchronized with the flowing signal despite conventional procedures that the supervisory control layer usually carries to solve such a problem. For example, in certain scenarios (e.g., when the supervisory channel is disrupted or deemed too slow to allow fast and flexible provisioning), the optical receiver either cannot or does not know the properties of the incoming signal and therefore cannot extract the information.

Accordingly, a need exists for a receiver that is capable of identifying and decoding signals, including complex signals, without any or all of the typically required foreknowledge of the signal's parameters.

SUMMARY

Briefly described, and according to some embodiments, aspects of the present disclosure generally relate to systems and methods for autonomously identifying and demodulating signals and, in particular, complex signals. In some embodiments, a method for autonomously determining the modulation format of an input signal can comprise estimating the input signal's frame length to determine if the input signal's modulation format is conventional or time-domain hybrid and, responsive to determining the modulation format is time-domain hybrid, identifying a plurality of modulation formats that compose the input signal's frame. The method can further comprise determining, based on the identified plurality of modulation formats, a ratio of a first modulation format to a second modulation format and determining, based at least in part on the plurality of modulation formats, the ratio, and the frame length, a pattern arrangement of the plurality of modulation formats in time.

In some embodiments, a method for autonomously determining the modulation format of an input signal can comprise determining the input signal's baud rate and estimating the input signal's chromatic dispersion (CD). Further, the method can include compensating, based at least in part on the estimation of the input signal's CD, the input signal's CD to generate a CD-compensated signal and processing the CD-compensated signal to determine a number of multiplexed polarizations of the input signal. Additionally, the method can include performing timing recovery on the CD-compensated signal to generate a timing-recovered signal representative of the input signal. The method can also include estimating the input signal's frame length to determine if the input signal's modulation format is conventional or time-domain hybrid and, responsive to determining the modulation format is time-domain hybrid, identifying a plurality of modulation formats that compose the input signal's frame. Further, the method can include determining, based on the identified plurality of modulation formats composing the input signal's frame, a ratio of a first modulation format to a second modulation format and generating, based at least in part on the plurality of modulation formats composing the input signal's frame, the ratio, and the input signal's frame length, a plurality of reference signals having the same frame length and comprising the same plurality of modulation formats that compose the input signal's frame, in the same ratio. Finally, the method can include comparing higher-order statistics of the input signal to each of the reference signals, and selecting, from the plurality of reference signals, a particular reference signal in which a first error criterion based on higher-order statistics of the particular reference signal and higher-order statistics of the input signal is lower than a second error criterion based on the higher-order statistics of the input signal and higher-order statistics of any remaining reference signal.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 10 illustrates modified theoretical normalized fourth-order cumulant values indicative of modulation format signatures among 2D Stokes space constellations.

DETAILED DESCRIPTION

Figure 1:
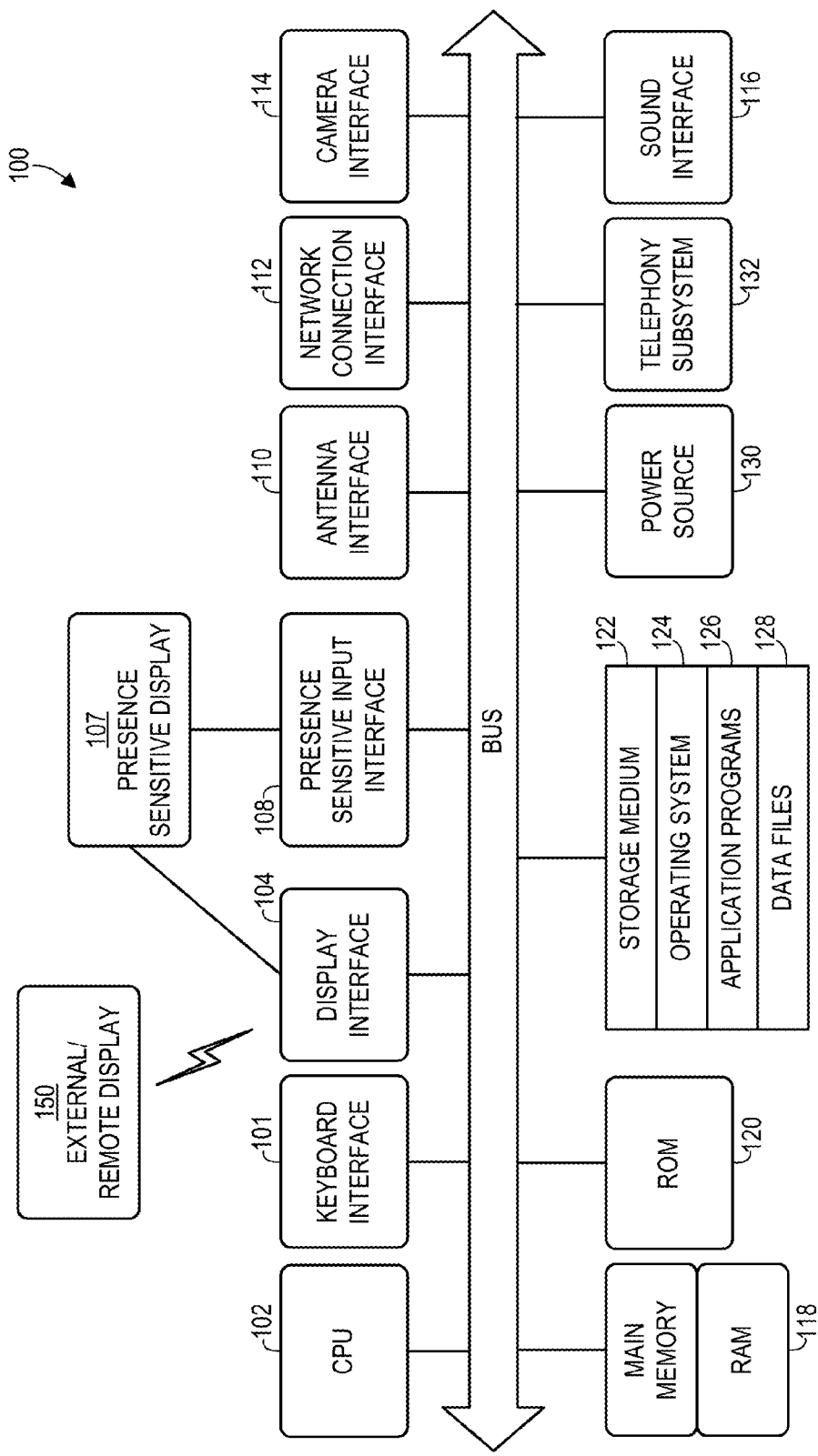
FIG. 1 is a block diagram of an illustrative computer system architecture 100, according to an example embodiment.

Certain embodiments of the disclosed technology provide systems and methods for reliable and robust, fully autonomous estimation of transmission parameters of a received signal such as baud rate, chromatic dispersion, and state of polarization. Further, embodiments of the disclosed technology provide systems and methods for autonomous identification and detection of signal transmission parameters and signal formats such as OOK, BPSK, QPSK, 16-QAM, M-QAM, M-PSK, and M-PAM, and complex signal formats that comprise at least two of OOK, BPSK, QPSK, 16-QAM, M-QAM, M-PSK, and M-PAM. Finally, embodiments of the disclosed technology provide systems and methods for optimally decoding received signals. In one embodiment, the disclosed systems and methods may be incorporated in the adaptable receivers, which may allow for the dynamic optimization of bandwidth demands coupled with the use of heterogeneous modulation formats on gridless optical networks.

In some embodiments, the receiver blindly receives a signal, which may have been transmitted via a wireless, optical, or wired channel. In blindly receiving the signal, the receiver receives the signal with no foreknowledge of the signal's transmission parameters. Alternatively, the receiver receives a signal with foreknowledge of one or more transmission parameters.

In some embodiments, the receiver is a digital coherent optical receiver comprising an optical hybrid wherein a local optical signal is mixed with the received optical signal. The resulting mixed signal is then split into four components representing orthogonal optical polarizations and orthogonal phases of the optical carrier. Typically, an embedded high-speed photodiode converts each of the signals to an electronic signal, and an analog-to-digital converter then samples the electronic signals to acquire samples that make up an input signal. In various embodiments, an input signal may comprise no useful information relating to transmission parameters. Further, as will be understood by one of skill in the art, it is common for a receiver to receive control signals comprising useful information relating to transmission parameters; however, in many instances, control signals may comprise no useful information relating to transmission parameters. Subsequently, a digital signal processing (DSP) module processes the input signals using a variety of digital DSP methods, as will be discussed herein.

Further, in some embodiments, the optical receiver, and the DSP module in particular, comprises an autonomous processing module (APM) comprising an architecture that operates in a serial fashion or, as needed, in parallel fashion, on input signals and enables autonomous or blind signal modulation format identification. In particular, an APM can blindly operate on input signals with no foreknowledge of total accumulated chromatic dispersion, baud rate, number of multiplexed polarizations, modulation format, or other transmission parameters. In one embodiment, upon receipt of the input signals, an APM processes the input signals to autonomously retrieve the received optical signal's transmission parameters. Further, once a signal's parameters are determined, the optical receiver decodes the received optical signals with performance equivalent to a traditional optical receiver, according to one embodiment.

According to some embodiments, the architecture of an APM may be divided into two consecutive, complementary modules for processing input signals. In one implementation, a first module receives an input signal (i.e., input data) and detects the input signal's transmission parameters (e.g., symbol rate, chromatic dispersion, state of polarization, etc.) as well as the input signal's modulation. A second module then robustly demodulates the input data through an optimized set of algorithms chosen according to the parameters extracted and format or formats recognized by the first module.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that embodiments of the disclosed technology may be practiced without these specific details. In other instances, well-known methods, structures and techniques have not been shown in detail in order not to obscure an understanding of this description. References to "one embodiment," "an embodiment," "example embodiment," "various embodiment," etc., indicate that the embodiment (s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example embodiments of the disclosed technology will now be described with reference to the accompanying figures.

As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.,) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components.

According to an example implementation, the computing device architecture 100 includes and a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
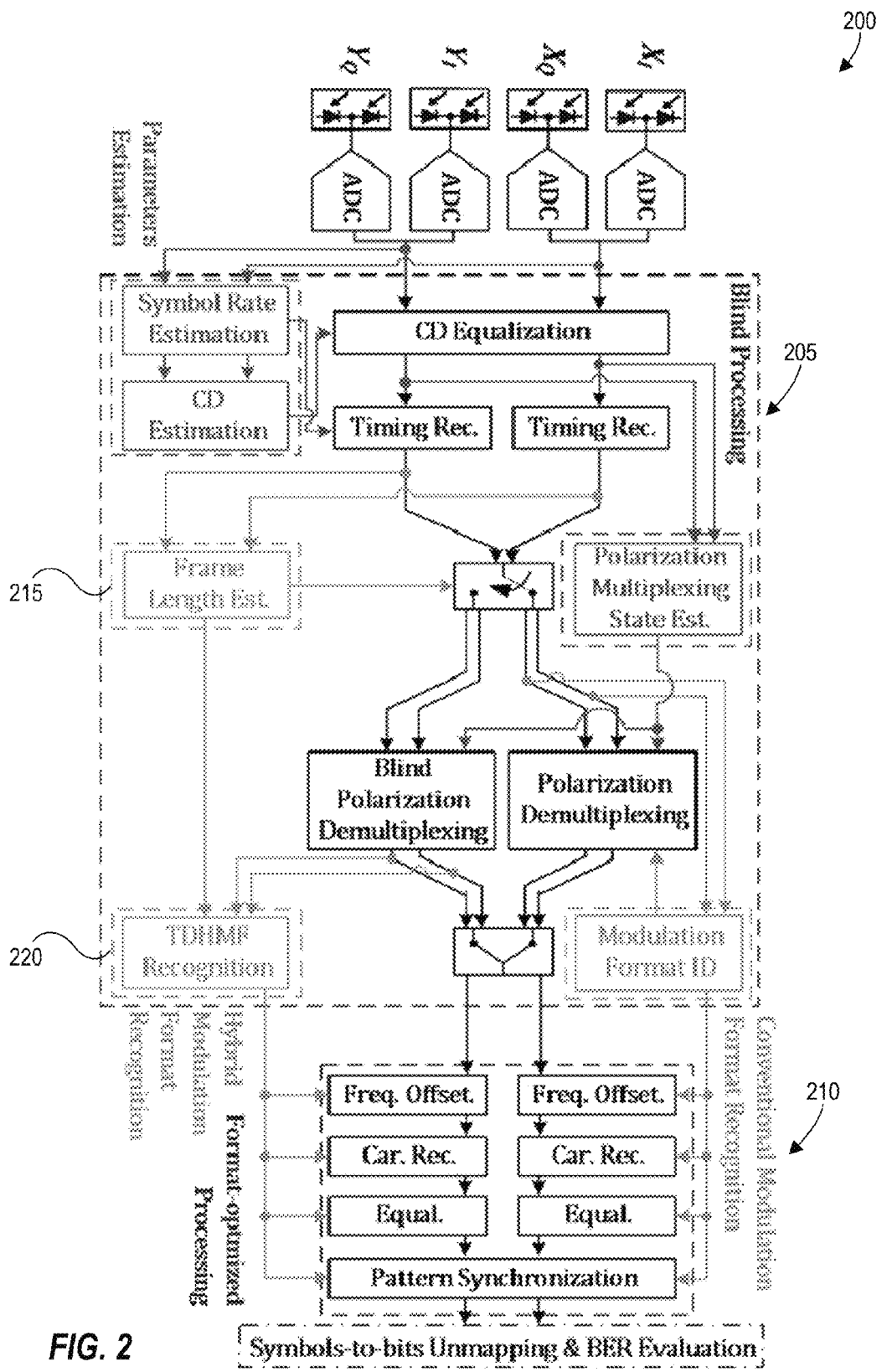
FIG. 2 is an overview of an exemplary architecture or a receiver 200 for implementing the proposed systems and methods, according to an example embodiment.

As noted, aspects of the present disclosure generally relate to systems and methods for autonomous or blind identification and demodulation of received signals. In some embodiments, a receiver may employ an autonomous processing module (APM) to implement the disclosed systems and methods. The architecture of an APM may comprise various processing modules for implementing various algorithms and processes used in agnostic demodulation. FIG. 2 provides an overview of an architecture for a receiver 200 according to some embodiments of the present disclosure.

As shown in FIG. 2, a receiver 200 can be implemented with blind and flexible algorithms for achieving demodulation of signals, including TDHMF signals. In some embodiments, the architecture can comprise first and second stages that, for convenience, may be described as first and second processing modules. This description is not, however, intended to be limiting and one of skill in the art will understand that various implementations and configurations can achieve the desired result.

In some embodiments, and as shown in FIG. 2, the first module 205 may implement a parallel processing approach for estimating a signal's transmission parameters (e.g., symbol rate, chromatic dispersion, and polarization multiplexing state). Further, the first module 205 may process the received signal to correct chromatic dispersion and optimally resample the signal. In addition, the first module 205 can estimate the frame length of the received signal to determine if the modulation format is homogenous (i.e., the signal has a unit frame length) or hybrid. Depending on whether the modulation format is homogenous or hybrid, a predetermined modulation format recognition process can be applied. The second module 210 can apply format-specific processing to separate polarizations, remove the frequency offset and LO-carrier phase noise, and mitigate inter-symbol interference and residual channel effects.

To recognize the TDHMF, a receiver 200 of the present disclosure can utilize the statistical distribution of the received signal's radius (or symbol radius distribution) and then compare that statistical distribution to known distributions. As will be understood by one of skill in the art, TDHMFs' symbol radius distribution contains more information than homogeneous modulation formats even after constellation normalization. In some embodiments, this process can involve identifying the signal's frame length (or pattern length), identifying the various modulation formats that compose the frame, determining the ratio of the various modulation formats in the frame, and determining the actual pattern arrangement in time.

As shown in FIG. 2 and as will be discussed further herein, in some embodiments, the first module 205 can perform frame length (or pattern length) estimation of a received signal. A frame length estimator 215 may evaluate the modulus of the received signal time-series in the Fourier domain to reduce or eliminate the frequency-offset tone that results from the imperfect locking of the transmitter laser. As will be appreciated, what remains is a significant tone that results from the pattern periodicity, which a frame length estimator 215 can used to estimate the TDHMF frame length. As will further be appreciated and understood by one of skill in the art, the absence of a significant tone indicates that the modulation format is homogenous instead of hybrid. Additionally, a frame length estimator 215 can avoid additional tones that result from the data-link frames periodicity by selecting appropriate block lengths because the data-link frame is slower than the line rate whereas, in comparison, the TDHMF frame rate is a fraction of the line rate.

In some embodiments, after determining frame length, a TDHMF recognition module 220 can assess the frame's composing modulation formats and their ratio within the frame by minimizing the mean square error between the received signal's symbol radius probability density function (PDF) and the symbol radius PDFs of reference (i.e., stored or previously known) TDHMFs. In some embodiments, the TDHMF recognition module 220 can assess a received signal's symbol radius PDF by assuming that the symbol radius PDF follows a Gaussian mixture model. Further, the TDHMF recognition module 220 can apply a variational learning algorithm to identify the mean radius of each mixture that composes the signal's symbol radius histogram. As will be appreciated, knowledge of the frame length can significantly reduce processing time by comparing the received signal's symbol radius distribution with a reduced set of TDHMFs.

After determining the frame's composing modulation formats and their ratio within the frame, a TDHMF recognition module 220 can identify the frame's pattern arrangement in time using HOS-based error criterion. In some embodiments, a lookup table or related data storage medium can store all possible pattern arrangements in time. Thus, following the determination of the pattern length and modulation formats ratio, a TDHMF recognition module 220 can compare the determined pattern length and modulation formats ratio to the known pattern arrangements. Thus, in some embodiments, the TDHMF recognition module 220 can compare the higher-order statistics of the received signal's symbol-time series to reference homogenous modulation formats' higher-order statistics. By minimizing the mean square error between the received signal's symbol-time series and the reference homogenous modulation formats' higher-order statistics (i.e., by selecting the reference homogenous modulation format having the lowest mean square error to the received signal's symbol-time series), the TDHMF recognition module 220 can determine the frame's pattern arrangement and thus the TDHMF of the received signal.

Figure 3:
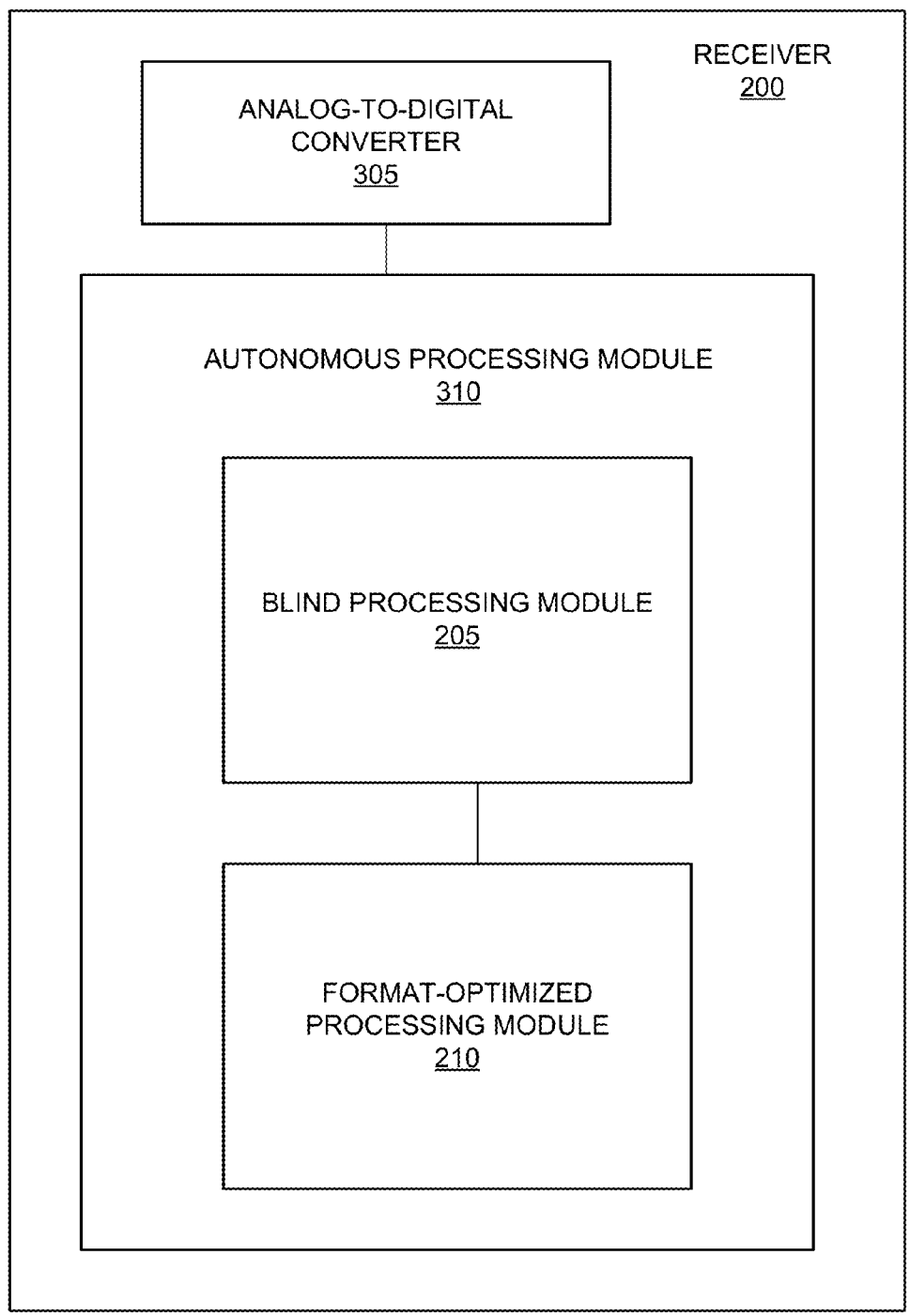
FIG. 3 is a schematic overview of a receiver 200 comprising an autonomous processing module (APM) 310, according to an example embodiment.

In some embodiments, the processing modules discussed in relation to FIG. 2 may be grouped into a blind processing module and a format-optimized processing module, which are operatively connected and may implement certain algorithms and processes related to agnostic identification and demodulation. FIG. 3 illustrates a schematic overview of a receiver 200, which comprises an autonomous processing module (APM) 310, the APM 310 comprising a blind processing module 205 and a format-optimized processing module 210, as shown in FIG. 2 and which will be described in further detail below. In some embodiments, the example receiver 300 may include some or all of the components of the computing device 100 shown in FIG. 1 or may be in operative communication with the computing device shown in FIG. 1. Further, in some embodiments, the receiver 300 may comprise an analog-to-digital converter 305 for processing the received signal, as will be understood by one of skill in the art. In one embodiment, an analog-to-digital converter 305 may comprise an optical-to-electrical converter and a digitizer (e.g., electrical digitizer). In some embodiments, an analog-to-digital converter 305 may first optically sample a signal, then convert the signal from an optical signal to an electrical signal, which the analog-to-digital converter 305 then digitizes.

After an analog-to-digital converter converts the received signal to an input signal, according to some embodiments, the input signal can be processed by the various submodules of the APM 310, as described below.

Figure 4:
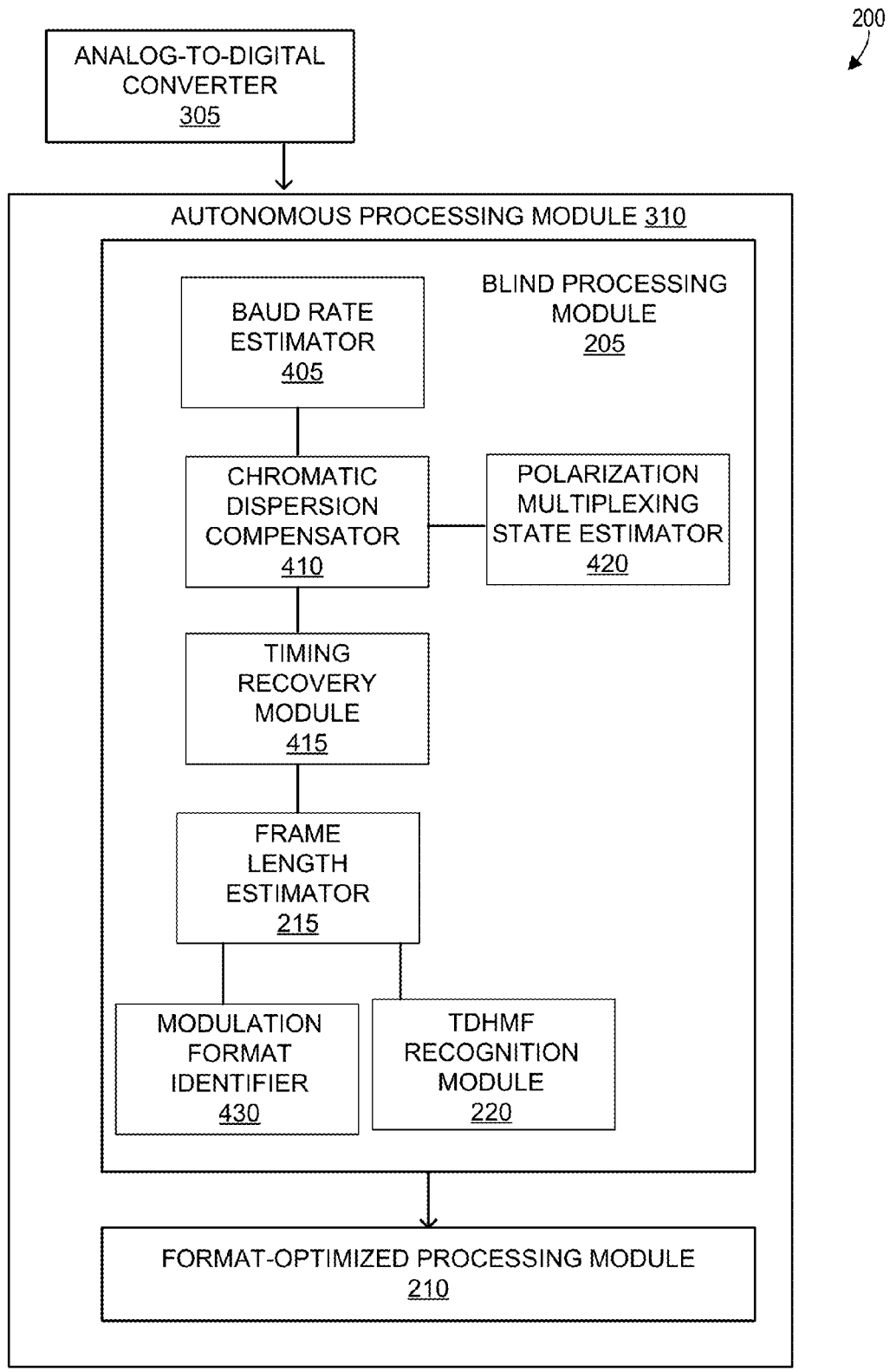
FIG. 4 is a block diagram of a blind processing module 205, according to an example embodiment.

Blind Processing Module:

In one embodiment, as shown in FIG. 3, an APM 310 can comprise a blind processing module 205. Further, as shown in FIG. 4, a blind processing module 205 may comprise a baud rate estimator 405, a chromatic dispersion compensator 410, a timing recovery module 415, a polarization multiplexing state estimator (PMSE) 420, and a modulation format identifier 430. As further shown in FIG. 4, the blind processing module 205 can be operatively connected to a format-optimized processing module 210, according to some embodiment. Further, as will be understood by one of skill in the art, while the various processes are depicted as discrete modules, the architecture is not limited to such configuration. Further, there is no suggestion or implication that the various processes must be performed serially. For example, as shown in FIG. 2, in some embodiments, the processes performed by a chromatic dispersion compensator 310 can be characterized as separate processes (i.e., CD estimation and CD equalization). Additionally, as shown in FIG. 4, a blind processing module 205 may comprise a frame length estimator 215 and a TDHMF recognition module 220.

Baud Rate Estimator

As noted, according to some embodiments, a blind processing module 205 can comprise a baud rate estimator (BRE) 405 for autonomously determining the baud rate of the received signal. Generally, classic baud rate estimators are not well-suited for optical receivers. Therefore, in one embodiment, a BRE 405 can employ a weighted version of a classical baud rate estimator. The weighted baud rate estimator can estimate the baud rate (i.e., signal rate) by exploiting the fact that the input signal is cyclostationary and further assuming that the baud rate is the input signal's only non-zero positive cyclic frequency. Structured data streams may present additional non-zero positive cyclic frequencies; however, the baud rate will necessarily be higher, as will be understood by one of skill in the art. The estimate of the cyclic-correlation at frequency α and delay τ is given by:

$$\hat{r}_T^{(\alpha)}[\tau] = \frac{1}{T}\sum_{n=0}^{T-1} x[n+\tau]\bar{x}[n]e^{2j\pi\alpha n} \quad (1)$$

where:

x[k] is the received data sequence;

$$\alpha = \frac{f}{f_s}\alpha$$

is me normalized frequency;

$f_s$ is the sampling frequency;

T is the number of samples in the block of samples processed.

The classical cyclic-correlation estimation vector at frequency α over the range of delays τ∈[0:2N] is given by:

$$\hat{R}_T^{(\alpha)} = [\hat{r}_T(\alpha)[0] \ldots \hat{r}_T(\alpha)[2N]] \quad (2)$$

Accordingly, the weighted version of the classical estimator $\hat{R}_T^{(\alpha)}$ is given by:

$$\hat{S}_T^{(\alpha)} = \Gamma(\alpha)^{-1/2}\hat{R}_T^{(\alpha)} \quad (3)$$

In the weighted estimator, Γ(α) is the asymptotic covariance matrix of the classical estimator $\hat{R}_T^{(\alpha)}$ in which, according to one embodiment, coefficient (i j) of Γ(α) is estimated by:

$$[\hat{\Gamma}(\alpha)]_{i,j} = z_1^{(\alpha)*}z_{2-}[j-i] \text{ for } i,j\in[0:2N] \quad (4)$$

with:

$$z_1^{(\alpha)}[n] = w[n]\overline{\hat{r}_T^{(0)}[n]}e^{2\pi j\alpha(n-1)} \quad (5)$$

$$z_2[n] = w[n]\hat{r}_T^{(0)}[n] \text{ for } n\in[1:L] \quad (6)$$

where:

$$z_{2-}[n] = z_2[-n] \quad (7)$$

and where:

$W[n] = [w[1] \ldots w[L]^t$: Blackmon window of length $L = 8N+1$ (8)

Further, according to one embodiment, the normalized baud rate, $$\alpha = \frac{f_{symbol}}{f_s},$$

can be estimated by the maximization problem:

$$\hat{\alpha}_0 = \arg\max_{\alpha \in ]0;1/2[} \|\hat{S}_T^{(\alpha)}\|^2 \qquad (9)$$

Further still, in one embodiment, to improve the robustness of the BRE 405, the BRE 405 may perform a coarse estimation and compensation of the chromatic dispersion (as is discussed in the section immediately following) to mitigate the impact of chromatic dispersion suffered by the optical wave during transmission prior to baud rate estimation. The coarse estimation and compensation of the chromatic dispersion may follow a time-domain implementation of a chromatic dispersion compensator 410, which will be discussed in the section immediately following. In one embodiment, this coarse estimation and compensation of chromatic dispersion is followed by a resampling process such that $$\frac{f_{symbol}}{f_s} < \frac{1}{4},$$

which is then followed by the baud rate estimation, as described.

Though the BRE 405 may roughly mitigate the accumulated chromatic dispersion for purposes of identifying the baud rate, a chromatic dispersion compensator 410 can precisely estimate and compensate (or equalize) the signal's chromatic dispersion, as will be discussed below.

Chromatic Dispersion Compensator

According to some embodiments, and as shown in FIG. 4, a blind processing module 205 may further comprise a chromatic dispersion compensator (CDC) 410 that can precisely estimate and compensate (or equalize) a signal's chromatic dispersion (CD). In some embodiments, the CDC 410 estimates the total accumulated CD, and then the CDC 410 compensates the estimated total accumulated CD. In one embodiment, the CDC 410 blindly (i.e., without foreknowledge of a signal's transmission parameters) estimates the total accumulated CD and compensates the estimated total accumulated CD.

Generally, correction of first-order dispersion is sufficient for most fiber links. Accordingly, the frequency domain transfer function of a CD compensating filter may be given by:

$$G(z, \omega) = \exp\left(-j\frac{Dz\lambda^2}{4\pi c}\omega^2\right) \qquad (10)$$

where:
  z is the total length of the fiber in which the optical signal is transmitted;
  λ is the carrier wavelength;
  c is the speed of light;
  D is the chromatic dispersion coefficient of the optical fiber.

For fiber systems comprising different spans of different fiber including dispersion-compensating fiber, equation (10) may be applied to the overall link. To blindly estimate the total accumulated CD (i.e., the effective Dz product), the CDC 410 may use a method based on the principle that the optimally compensated signal has minimum amplitude variance. Accordingly, in some embodiments, after separately compensating both polarizations of the signal, the CDC 410 can evaluate an error criterion, which is based on the signal's variance, with different trial values of CD. These trial values of CD span a broad range using a step size that can be dynamically adjusted. In some embodiments, the estimated total accumulated CD is determined when the corresponding compensated optical signal exhibits minimum variance (i.e., when the error criterion reaches its minimum or when the corresponding compensated optical signal has minimum bit rate error) because it has been shown that minimum variance corresponds to minimum BER, which will be understood by one of skill in the art. Further discussion of methods for blindly estimating the accumulated CD are discussed in M. Kuschnerov et al. *Adaptive Chromatic Dispersion Equalization for Non-Dispersion Managed Coherent Systems*, presented at OSA/OFC/NFOEC 2009.

As will be understood by one of skill in the art, after the CDC 410 estimates the accumulated CD, the CD compensation can be processed in the time domain or in the frequency domain. CD compensation filter size depends on total accumulated CD (corresponding delay spread), estimated above, as well as the symbol rate as estimated by the BRE 405. For example, for large values of accumulated CD, frequency domain equalization shows considerable advantages over time domain equalization in terms of computational complexity. Accordingly, in some embodiments, the CDC 410 may employ an overlap frequency domain equalization method based on CD compensation in the frequency domain of overlapping block data. Similar methods are discussed in R. Kudo, et al., *Coherent Optical Single Carrier Transmission Using Overlap Frequency Domain Equalization for Long-Haul Optical Systems*, Journal of Lightwave technology, Vol. 27, No. 16, 2009.

Timing Recovery Module

As discussed, in some embodiments, a receiver (e.g., receiver 200) may receive a signal with no foreknowledge of the transmitted signal's transmission parameters. Accordingly, because there is no timing reference, the received signal may necessarily be processed asynchronously, thus yielding an input signal comprising non-idealized samples (i.e., samples that were not acquired at the ideal moment). Demodulation, however, typically requires that data be processed synchronously. Accordingly, autonomous modulation format recognition may require that timing recovery be performed on the input signal by a timing recovery module (TRM) 415 to synchronize the receiver clock with the received data stream. In some embodiments, a TRM 415 may process a signal to generate a timing-recovered signal, which may comprise a plurality of optimally-sampled symbols.

In some embodiments, a TRM 415 may employ a digital filter and square timing recovery algorithm to retrieve the timing phase error and the optimal sampling instant. This algorithm may extract an integer number of samples per symbol for both polarizations of the received signal. For example, if two samples are chosen per symbol, one sample may be chosen at maximum eye opening and the other may be chosen one-half a symbol period apart. The discrete sequence of the filtered and squared input signal contains a spectral component at the baud rate estimated by the BRE 405. So, in some embodiments, the TRM 415 can measure this frequency component, which in turn allows the TRM 415 to determine the timing phase error and the optimal sampling instant. Within the $n^{th}$ symbol, the optimal sampling instant is given by:

$$t_{opt}[n]=T_s(n+E[\hat{\epsilon}])  \quad (11)$$

where:
 $T_s$ is the symbol period;
 $\hat{\epsilon}$ is the estimator comprising the normalized phase error and the maximum eye opening localization in the symbol;
 $E[\hat{\epsilon}]$ is the expectation of the estimator $\hat{\epsilon}$.
The estimator $\hat{\epsilon}$ is given by:

$$\hat{\epsilon} = -\frac{1}{2\pi}\arg\left(\sum_k s[k]e^{\frac{2\pi jk}{N}}\right) \quad (12)$$

where:
 s[k] is the discrete sequence of the filtered and squared input signal;
 N is the number of samples in the block of data samples processed.
Algorithms are discussed in M. Oerder, H. Meyr, Digital Filter and Square Timing Recovery, *IEEE Trans. On Comm.*, Vol. 36, No. 5, 1988.

Polarization Multiplexing State Estimator

In one embodiment, an optical receiver and APM 310 can be configured to assume that the received signal was transmitted on both of the orthogonal polarizations. But, before an APM 310 or blind processing module 205 can determine an input signal's modulation format, it may be necessary to estimate whether the transmitter performed polarization multiplexing on the input signal (i.e., determine the number of multiplexed polarizations). In one embodiment, a polarization multiplexing state estimator (PMSE) 420 can perform such processing.

In some embodiments, a PMSE 420 can estimate the number of distinct multiplexed polarizations by operating a cross correlation between the X and Y polarization. Accordingly, if the cross correlation signal displays a maximum at lag zero and several symmetric secondary maxima, it can be assumed that the received signal (and, accordingly, the input signal) is single-polarized. If, however, the cross correlation signal displays low peaks for non-zero lags, the signal is dual-polarized (i.e., the signal comprises distinct signals on each of a first and second polarization). Accordingly, in some embodiments, prior to identifying the signal's modulation format, it may be necessary to perform further processing, which may include estimating the signal's SOP and performing polarization scrambling mitigation (i.e., polarization demultiplexing), as will be discussed herein.

Frame Length Estimator

As discussed previously, to demodulate a received TDHMF signal, the receiver 200 requires knowledge of the signal's pattern length, composing modulation formats, their ratio in the pattern, and the pattern arrangement in time. For example, if the TDHMF is BPSK2-QPSK3, then the frame length is 5, the constituent modulation formats are BPSK and QPSK, their ratio on the hybrid pattern are (2,3) and the hybrid pattern time-arrangement can be BPSK-BPSK-QPSK-QPSK-QPSK, or BPSK-QPSK-BPSK-QPSK-QPSK. Thus, as discussed in relation to FIG. 2, in some embodiments, a receiver 200 can comprise a frame length estimator 215 to perform frame length (or pattern length) estimation of a received signal, and a TDHMF recognition module 220, which can assess the frame's composing modulation formats and their ratio within the frame.

As noted previously, in some embodiments, a frame length estimator 215 may evaluate the modulus of the received signal time-series in the Fourier domain to reduce or eliminate the frequency-offset tone that results from the imperfect locking of the transmitter laser. Further, in some embodiments, estimation of the format pattern length can be performed before polarization demultiplexing. As will be appreciated, a frame length estimator 215 can determine the number of symbols in the TDHMF's pattern, and can also determine if the modulation format is conventional (unit frame length) or time-domain hybrid.

Figure 5:
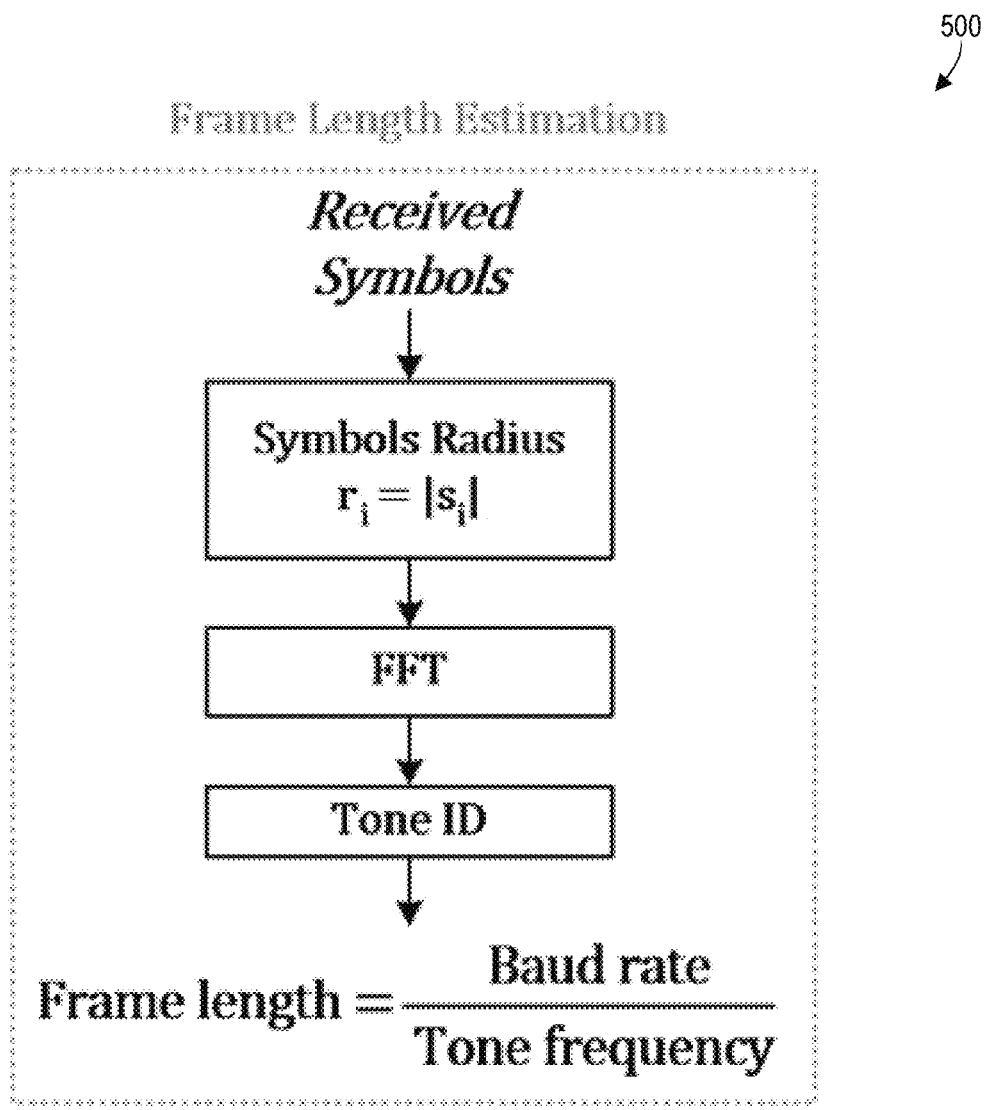
FIG. 5 is an algorithm 500 for estimating frame length and which can be implemented by a frame length estimator 215, according to an example embodiment.

FIG. 5 is an algorithm 500 for estimating the frame length and which can be implemented by a frame length estimator 215, according to some embodiments. The frame length estimator 215 can evaluate the modulus of the received signal time-series in the Fourier domain, which can in turn cause the frequency-offset tone resulting from the imperfect locking of the transmitter laser and the LO to disappear. As will be appreciated, what remains is a significant tone that results from the pattern periodicity, and the frame length estimator 215 can use that significant tone to estimate the TDHMF frame length. Also, as will be appreciated, if there is no significant tone, it indicates to the frame length estimator 215 that the modulation format is not hybrid but is instead conventional (i.e., unit frame length).

TDHMF Recognition Module

In some embodiments, after determining a frame length, a TDHMF recognition module 220 can determine a TDHMF's composing modulation formats, their ratio in the pattern, and the pattern arrangement in time. As discussed previously, to demodulate a received TDHMF signal, the receiver 200 requires not only knowledge of the signal's pattern length, but also the signal's composing modulation formats, their ratio in the pattern, and the pattern arrangement in time.

In some embodiments, a TDHMF recognition module 220 can assess composing modulation formats and their ratio in the pattern by minimizing the mean square error between the received signal's symbol radius PDF and the symbol radius PDF of a plurality of reference TDHMFs. In some embodiments, the TDHMF recognition module 220 can assess the received signal's symbol radius PDF by assuming that the symbol radius PDF follows a GMM, and by applying a machine learning algorithm that implements variational Bayesian expectation maximization for GMMs to identify the mean radius of each mixture composing the signal's symbol radius histogram. As will be appreciated, the knowledge of the pattern length can significantly reduce processing time by comparing the received signal's symbol radius distribution with a reduced set of known reference TDHMFs.

Upon determining the pattern length, the composing modulation formats, and their ratio in the pattern, the TDHMF recognition module 220 can determine the pattern arrangement in time. In some embodiments, the TDHMF recognition module 220 can identify the pattern arrangement in time using an HOS-based error criterion. In particular, in some embodiments, following the determination of the pattern length, the composing modulation formats, and their ratio, the TDHMF recognition module 220 can compare the results against all possible pattern arrangements by accessing a lookup table or other storage medium. In some implementations, for each case, the TDHMF recognition module 220 can extract subsets of the received signal's symbol time-series, and then compare the HOS of those extracted subsets to reference homogeneous modulation formats' HOS. After comparing to a plurality of the reference homogenous modulation formats' HOS, the TDHMF recognition module 220 can determine the pattern arrangement in time by minimizing the mean square error between the extracted subsets and the plurality of reference homogenous modulation formats' HOS (i.e., the TDHMF recognition module 220 can select as the pattern arrangement the reference homogenous modulation format whose HOS is lowest as compared to the extracted subsets).

Figure 6A:
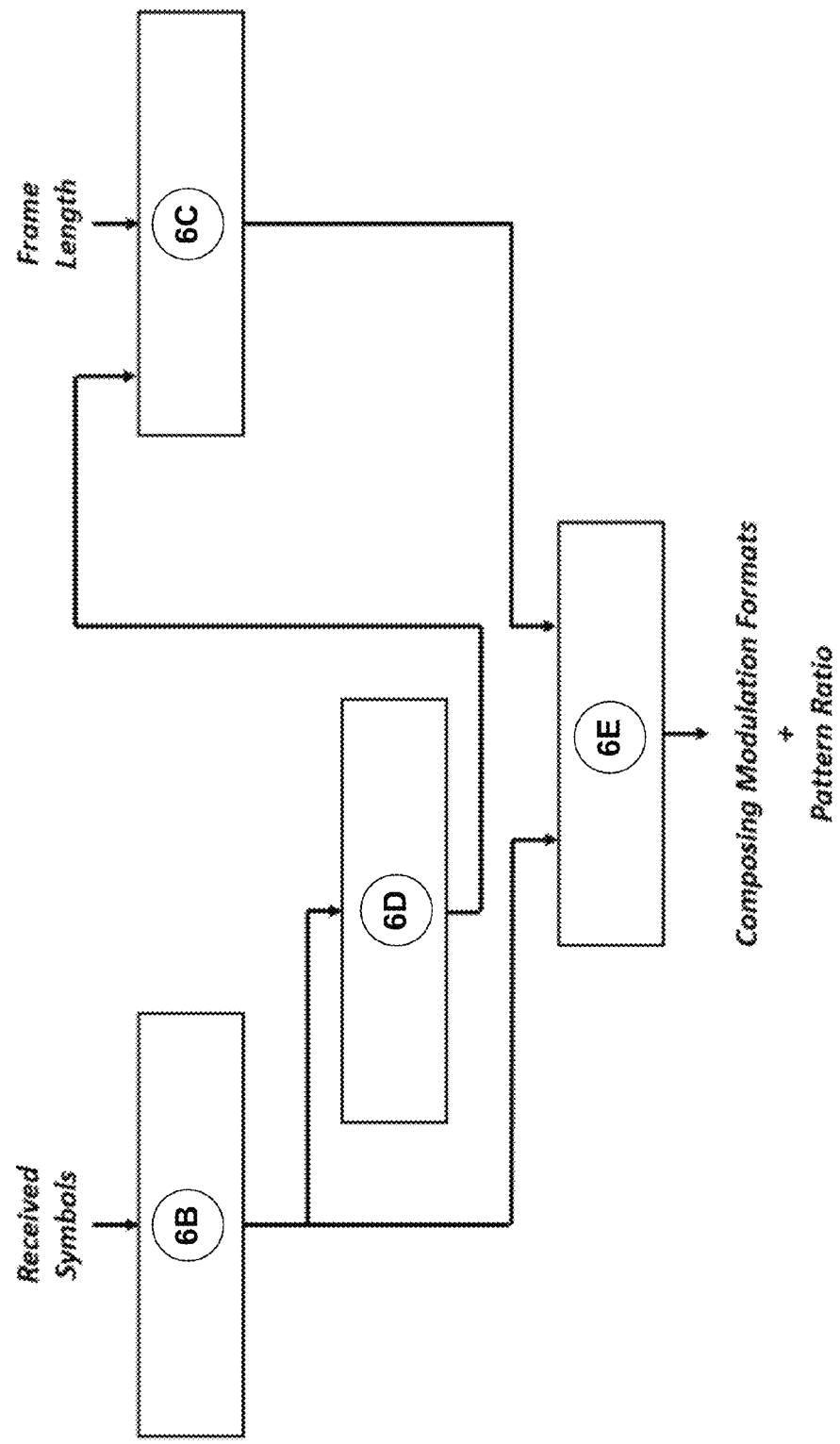
FIGS. 6A-6E illustrate various processes carried out by a TDHMF recognition module 220, according to an example embodiment.
Figure 6B:
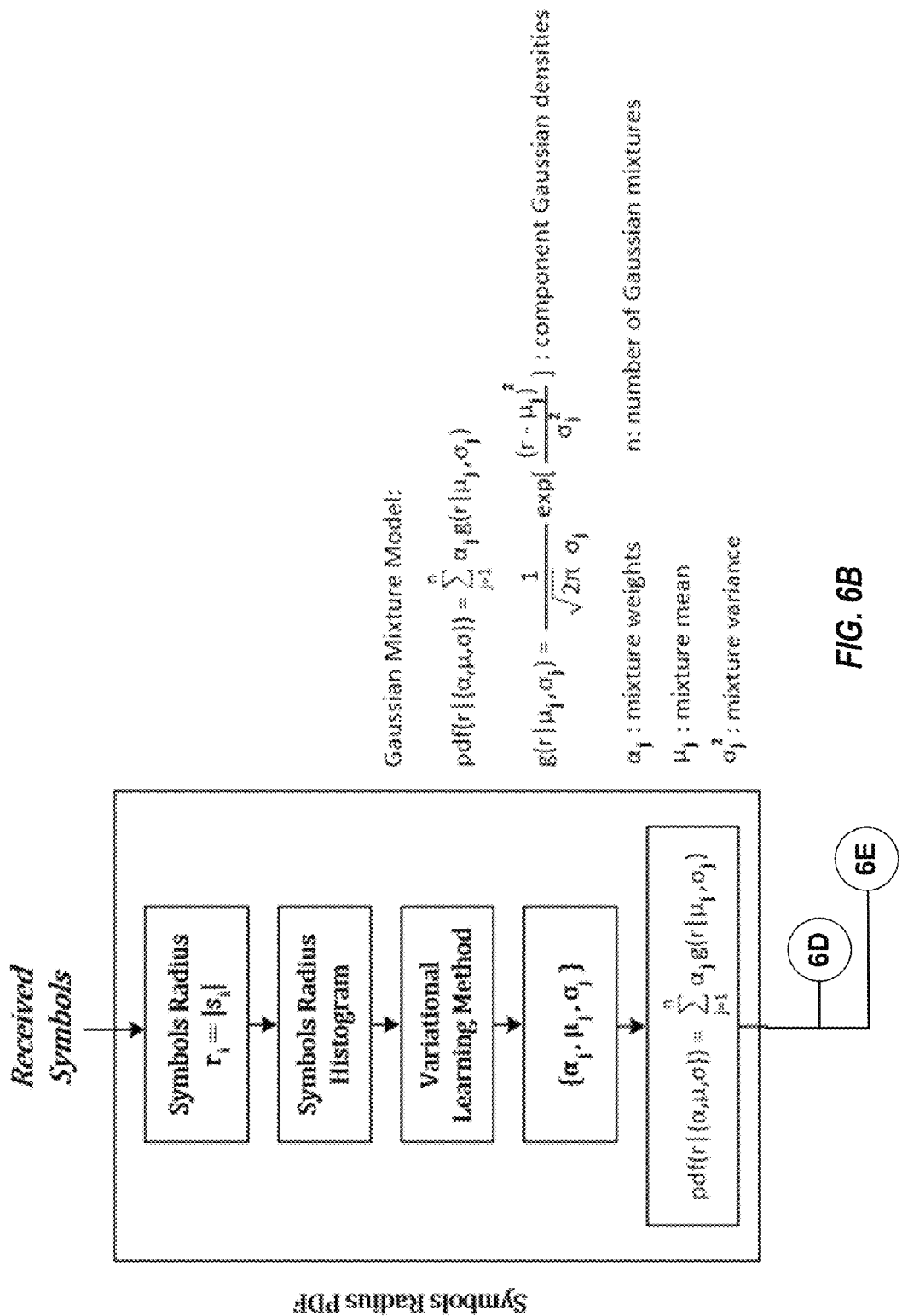
Figure 6C:
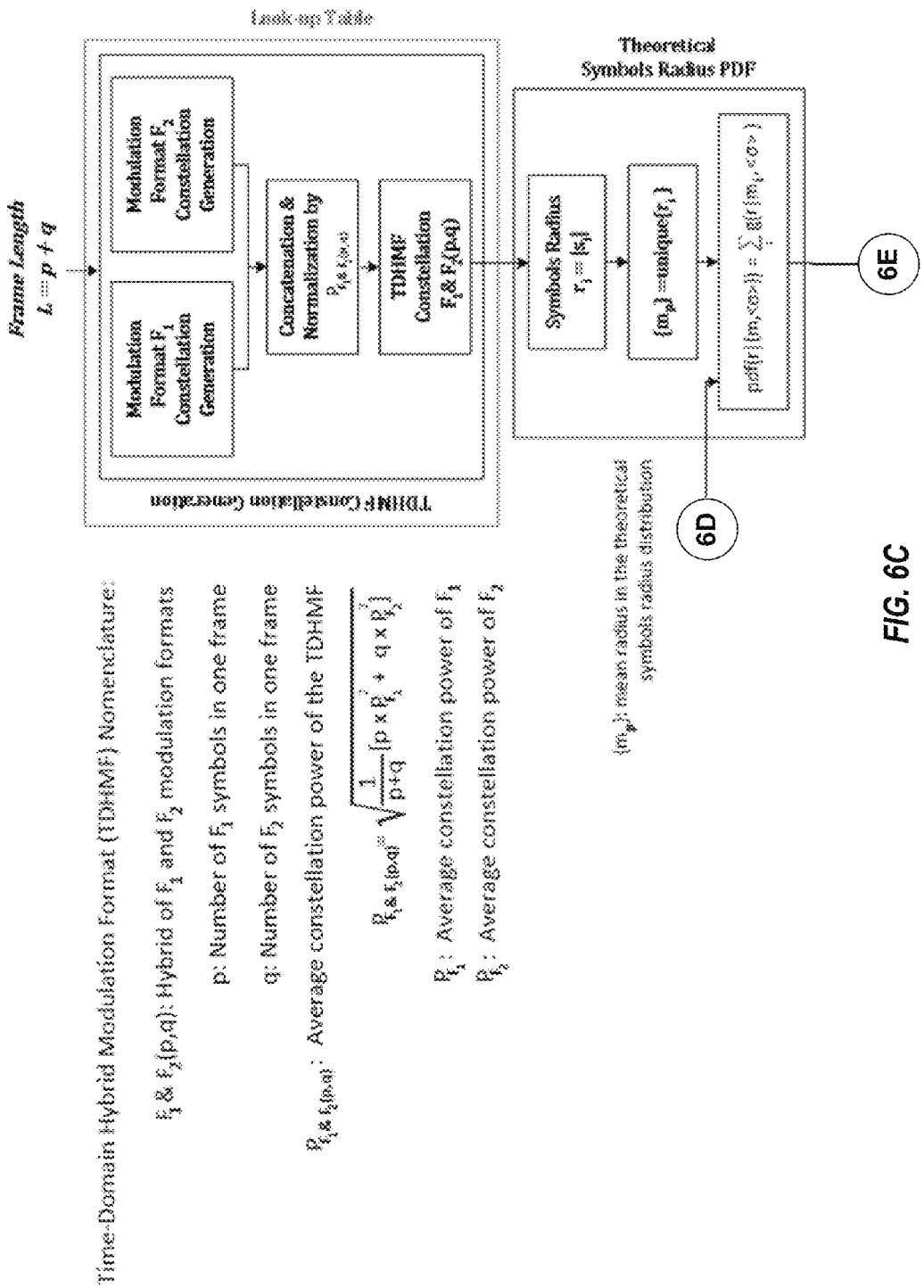
Figure 6D:
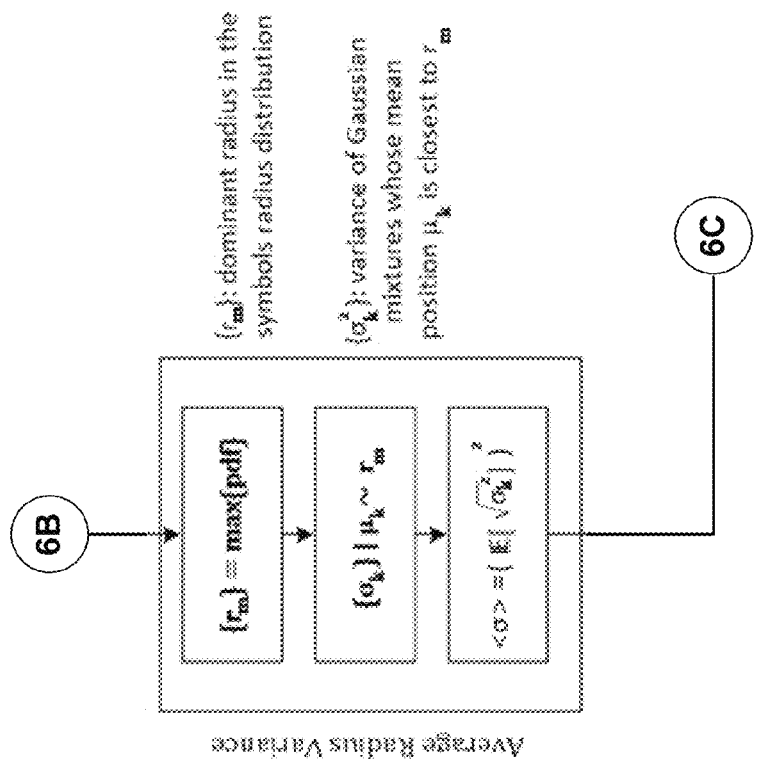
Figure 6E:
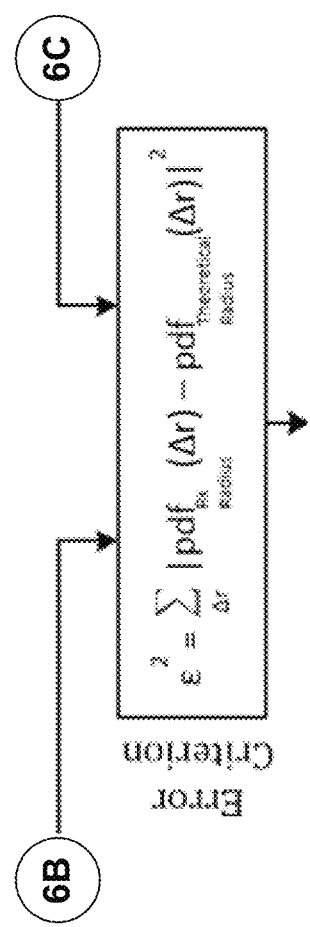

FIGS. 6A-6E illustrate various processes carried out by a TDHMF recognition module 220, according to some embodiments. FIG. 6A is an overview 600 of the processes implemented by a TDHMF recognition module 220. FIG. 6B illustrates a process for assessing the signal's symbol radius PDF. In particular, in some embodiments and as shown in FIG. 6B, a TDHFM recognition module 220 may assume that that a signal's symbol radius PDF follows a GMM, and by applying a machine learning algorithm (i.e., variational Bayesian expectation maximization for GMMs) the TDHFM recognition module 220 can identify the mean radius of each mixture composing the signal's symbol radius histogram. As will be discussed, a TDHFM recognition module 220 can then compare the identified symbol radius PDF to known theoretical symbol radius PDFs, as is described below. As shown in FIG. 6C, in some embodiments, a TDHMF recognition module 220 can generate theoretical symbol radius PDFs, which can be added to a lookup table or storage medium for comparison to the symbol radius PDF of the received signal. In particular, in some embodiments, a TDHFM recognition module 220 can generate constellations of considered time domain hybrid modulation formats, and then calculate the associated theoretical symbol radius PDFs for the considered time domain hybrid modulation formats, which can be stored to a lookup table or other storage medium. FIG. 6D illustrates a process by which a TDHMF recognition module 220 can extract a noise signature from a received input signal and then modify the known symbol radius PDFs with the extracted noise signature. As will be appreciated, by overlaying the known symbol radius PDFs with the extracted noise signature, a TDHMF recognition module 220 can more accurately match a known symbol radius PDF to the received symbol radius PDF. Finally, FIG. 6E illustrates an error criterion process that can be implemented by a TDHMF recognition module 220, according to some embodiments, in which a received signal's symbol radius PDF is compared to the theoretical symbol radius PDFs for the considered time domain hybrid modulation formats stored in the lookup table or other storage medium. As shown in FIG. 6E, in some embodiments, the TDHMF recognition module 220 can compare the received signal's symbol radius PDF to a known (i.e., theoretical) symbol radius PDF, and for that pair, the TDHMF recognition module 220 can generate an error. After generating an error between the received signal's symbol radius PDF and the stored theoretical symbol radius PDFs, the TDHMF recognition module 220 can select the pair with the lowest error which, as will be appreciated, represents the closest match between the received signal's symbol radius PDF and the theoretical symbol radius PDFs, which in turn provides the composing modulation formats and the ratio of the composing modulation formats of the received signal.

In some embodiments, after determining the composing modulation formats and the ratio of the composing modulation formats of the received signal, as well as the frame length, TDHMF recognition module 220 (or MFI 430) can determine the pattern arrangement in time utilizing an HOS-based error criterion. In particular, in some embodiments, a TDHMF recognition module 220 can generate a plurality of reference signals that comprise the determined composing modulation formats in the determined ratio based on the frame length (i.e., the possible pattern arrangements in time). Further, the TDHMF recognition module 220 can determine HOS of the possible arrangements in time and compare HOS of the input signal to the HOS of the possible pattern arrangements in time. By minimizing the mean square error between HOS of the input signal and HOS of each of the possible arrangements in time, the TDHMF recognition module 220 can determine the pattern arrangement of the input signal (i.e., the time domain hybrid modulation format). Put differently, the TDHMF recognition module 220 can determine the time domain hybrid modulation format of the input signal based on comparing HOS of the received signal with HOS of each of the possible arrangements in time and minimizing the error between the various pairs (i.e., determining which error is smallest).

In some embodiments, upon determining that a signal's modulation format is conventional, a receiver 200 of the present disclosure may continue processing the signal via a modulation format identifier 430. As will be appreciated, in some scenarios, despite the processing performed by the BRE 405, CDC 410, TRM 415, and PMSE 420, an APM 310 or blind processing module 205 cannot determine the modulation format of the input signal without further processing. In particular, the received polarizations may not possess the same basis as the transmitted polarizations. Additionally, because the transmitter lasers and receiver lasers (i.e., local oscillators or LO lasers) may not be frequency locked, the constellation can be spinning over time (in both polarizations), i.e., there is an additional time-dependent phase, which necessitates further processing to reduce spin prior to determining the modulation format. Accordingly, as will be discussed herein, a modulation format identifier (MFI) 430 may employ various novel methods for identifying modulation formats of input signals. Further, depending on the method utilized for identifying the modulation format, an MFI 430 may employ varying polarization demultiplexing techniques for demultiplexing or sub-optimally demultiplexing the input signal. In some embodiments, and as will be discussed, an optimized polarization demultiplexer is part of a format-optimized processing module 210. According to some embodiments and as will be discussed, after identifying the modulation format, an APM 310 may employ a format-optimized processing module 210 for demodulating the input signal. In some embodiments, after a blind processing module 205 determines an input signal's transmission parameters (e.g. baud rate, total accumulated chromatic dispersion, number of multiplexed polarization, modulation format, pattern arrangement, etc.), reevaluation of transmission parameters may be done in parallel or on an as-needed basis. Accordingly, and as will be appreciated, an APM 310 or blind processing module 205 may not necessarily need to perform processes associated with the 4RE 305, the CDC 410 (e.g., estimation of the CD), the PMSE 420, and the MFI 430, thus allowing the APM 310 to focus on the demodulation of the input signal once transmission parameters have been estimated or identified.

Stokes Space-Based Modulation Format Recognition Using Advanced Statistical Methods In some embodiments, an MFI 430 may employ a Stokes space-based scheme using advanced statistical methods to determine a signal's modulation format (e.g., OOK, M-QAM, M-PSK, M-PAM, and other modulation formats).

As will be appreciated by one of skill in the art, there are advantages to performing modulation format recognition in Stokes space. Because a modulation format has a unique signature in Stokes space, it is possible to identify an input signal's modulation format in a unique fashion by mapping the input signal to Stokes space and then evaluating the 3D expansion. Further, in some embodiments, it may be possible to bypass any process for polarization demultiplexing because the Stokes space constellation (i.e., the 3D expansion that results from mapping the input signal to Stokes space) is independent of the input signal's received state of polarization. It should be noted that variation in the received state of polarization does cause a rotation of the Stokes space constellation in time; however, this rotation does not affect the Stokes space-based modulation format recognition using advanced statistical methods. Likewise, as will be understood by one of skill in the art, the Stokes space constellation is independent of any residual carrier-LO frequency offset contained in the input signal. But, Stokes space mapping can be sensitive to noise, which may cause cluster expansion. Further, Stokes space constellations may be sensitive to optical fiber impairments such as polarization mode dispersion (PMD) and polarization dependent loss (PDL).

Figures 7, 8:
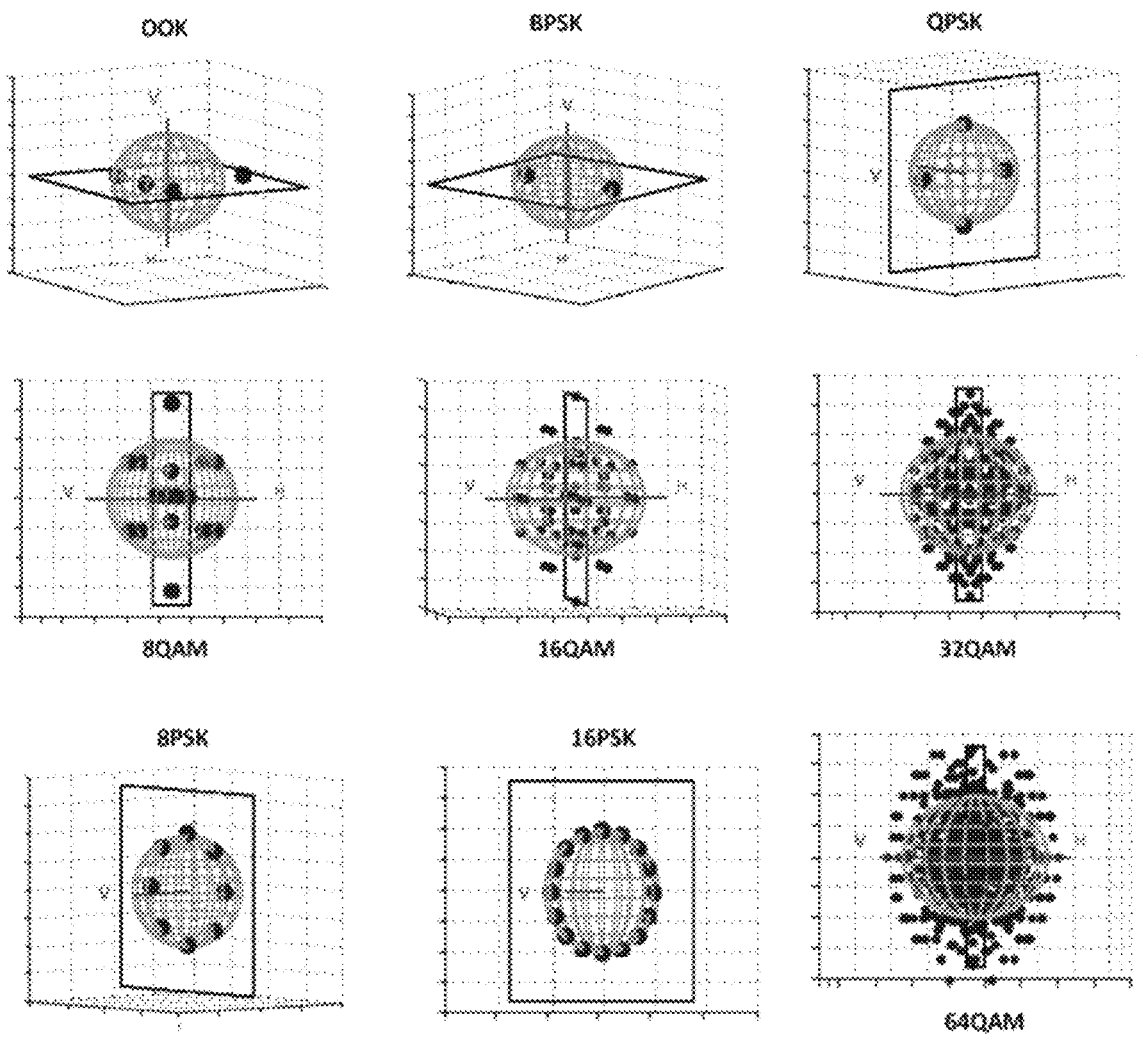
FIG. 7 illustrates ideal noiseless Stokes space constellations for dual-polarization optical signals modulated with particular modulation formats.
FIG. 8 is a table of theoretical values for different modulation formats of the coefficient C used for detection of a Stokes space constellation dimension.

Accordingly, in some embodiments, after the PMSE 420 processes the input signal, it may be possible to map the output to the 3-dimensional Stokes space. Typically, the input signal may be mapped to Stokes space to generate a representation of the input signal in three-dimensional space. As will be understood, the representation of the input signal in three-dimensional space generally comprises a certain number of three-dimensional clusters (e.g., as shown in FIG. 7, in which ideal noiseless Stokes space constellations are illustrated for dual-polarization optical signals modulated with OOK, BPSK, QPSK, 8PSK, 16PSK, 8QAM, 16QAM, 32QAM, and 64QAM). As will be discussed herein, these clusters generally comprise a weight, a mean position, and a particular number of Stokes space symbols. These Stokes space symbols are three-dimensional points in Stokes space. Further, the particular number of Stokes space symbols can serve as a proxy for the weight of the cluster itself. As noted, further information relating to mapping of signals into 3-dimensional Stokes space is disclosed in B. Szafraniec et al., *Polarization Demultiplexing in Stokes space*, Optics Express, Vol. 18, No. 17 (2010). As will be understood by one of skill in the art, the 4-dimensional Stokes space vector is given by:

$$S = \begin{pmatrix} s_0 \\ s_1 \\ s_2 \\ s_3 \end{pmatrix} \quad (13)$$

The component $s_0$ corresponds to the signal power, and the sub-vector $\hat{s}=(s_1\ s_2\ s_3)^T$ is taken into account when mapping of the signals to the 3-dimensional Stokes space. According to some embodiments, the components $s_1\ s_2\ s_3$ of the sub-vector $\hat{s}$ can be expressed in terms of the received signal after digitization.

As noted, in some embodiments, E(t) represents the electric field component of the received optical signal, and x[k] & y[k] represent the received electrical signals after digitization, CD equalization, timing recovery, and normalization. Accordingly, when $$E(t) = \begin{pmatrix} E_x(t)e^{j(\Delta\omega t + \phi_x(t))} \\ E_y(t)e^{j(\Delta\omega t + \phi_y(t))} \end{pmatrix} \quad (14)$$

$$\begin{pmatrix} x[k] \\ y[k] \end{pmatrix} = \frac{1}{\sqrt{2}} \begin{pmatrix} a_x[k]e^{j(\Delta\omega k + \phi_x[k])} \\ a_y[k]e^{j(\Delta\omega k + \phi_y[k])} \end{pmatrix} \quad (15)$$

where:
$E_x(t)$, $E_y(t)$ are the amplitude of the electric field in the X and Y polarizations;
$\Delta\omega$ is the residual frequency offset;
$\phi_x(t)$, $\phi_y(t)$ are the phase components of the electric field in the X and Y polarizations;
$a_x[k]$, $a_y[k]$ are the amplitude of the received electrical signals after digitization;
$\phi_x[k]$, $\phi_y[k]$ are the digitized phase components of the electric field in the X and Y polarizations;
the components $s_1\ s_2\ s_3$ can be expressed as:

$$\begin{pmatrix} s_1[k] \\ s_2[k] \\ s_3[k] \end{pmatrix} = \begin{pmatrix} a_x[k]^2 - a_y[k]^2 \\ 2a_x[k]a_y[k]\cos(\Delta\phi[k]) \\ 2a_x[k]a_y[k]\sin(\Delta\phi[k]) \end{pmatrix} \quad (16)$$

where:

$$\Delta\phi[k]=\phi_y[k]-\phi_x[k] \quad (17)$$

Typically, when mapped into the Stokes space, the signal is contained in a lens-like geometrical figure that rotates in time, which indicates that the received state of polarization is fluctuating in time. Therefore, the polarization states of transmission (i.e., Jones vector) are contained in the normal of the least-square (LS) plane to the lens-like geometrical figure.

In certain instances where polarization division multiplexing has not been performed on the transmitted signal (e.g., in the case of a single polarization signal), the mapping process may be modified to account for the single-polarization nature of the received signal. In some embodiments, to exhibit the received single-polarization signal modulation format signature in the 3-dimensional Stokes space, an MFI 430 may emulate a received dual-polarization signal based on the received single-polarization signal. Whether the received signal comprises data modulated on one or two orthogonal polarizations, the MFI 430 typically delivers two electrical signals corresponding to the detection of the received optical signal along two arbitrary orthogonal polarizations, according to some embodiments.

As will be understood by one of skill in the art, in the case of single-polarization signals, x[k] & y[k] are redundant as they contain the same amount of information, which may cause the system to fail. Accordingly, in some embodiments, in the case of single-polarization signals, instead of using a y[k] that contains the same amount of information as x[k], an MFI 430 may create a virtual received dual-polarization signal that uses by using a delayed version of the x[k] symbols instead of the y[k] symbols. Accordingly, in some embodiments, the MFI 430 utilizes:

$$\begin{pmatrix} x'[k] \\ y'[k] \end{pmatrix} = \frac{1}{\sqrt{2}} \begin{pmatrix} a'_x[k]e^{j(\Delta\omega k + \phi_{x'}[k])} \\ a'_y[k]e^{j(\Delta\omega k + \phi_{y'}[k])} \end{pmatrix} = \begin{pmatrix} x[k] \text{ for } k \in [[0:N]] \\ x[k] \text{ for } k \in [[-L:N-L]] \end{pmatrix} \quad (18)$$

The components $s_1\ s_2\ s_3$ can be expressed as:

$$\begin{pmatrix} s_1[k] \\ s_2[k] \\ s_3[k] \end{pmatrix} = \begin{pmatrix} a'_x[k]^2 - a'_y[k]^2 \\ 2a'_x[k]a'_y[k]\cos(\Delta\phi'[k]) \\ 2a'_x[k]a'_y[k]\sin(\Delta\phi'[k]) \end{pmatrix} \quad (19)$$

where:

$$\Delta\phi'[k] = \phi_{y'}[k] - \phi_{x'}[k] \quad (20)$$

Further, as discussed, in some embodiments, the representation of the input signal mapped in 3-dimensional Stokes space is assumed to follow the Gaussian mixture model. A mixture of Gaussians approximates a given probability density as:

$$p(\hat{s}) = \Sigma_{i=1}^{N} w_i g(\hat{s}|\mu_i, \Sigma_i) \quad (21)$$

where:

$\hat{s}$ is the 3-dimensional Stokes-space sub-vector discussed above;

N is the number of components;

$g(\hat{s}|\mu_i,\Sigma_i)$ is the $i^{th}$ component's Gaussian probability density function:

$$g\left(\hat{s} \mid \mu_i, \sum_i\right) = \frac{1}{\sqrt{(2\pi)^3 |\sum_i|}} \exp\left[-\frac{1}{2}(\hat{s}-\mu_i)^T \sum_i^{-1}(\hat{s}-\mu_i)\right] \quad (22)$$

$w_i$ are the Gaussian mixture weights;

$\mu_i, \Sigma_i$ are the mean vector and the covariance matrix of the $i^{th}$ Gaussian mixture;

Gaussian mixture components can comprise multiple Stokes space symbols that are 3-dimensional points in Stokes space that result from the mapping of the received optical signal to Stokes space. As will be understood by one of skill in the art, each of the 3-dimensional points can be located in Stokes space by coordinates that can be given by $\hat{s} = (s_1\ s_2\ s_3)^T$. In some embodiments, the number of Stokes space symbols contained in the $i^{th}$ Gaussian mixture component serves as a proxy for the Gaussian mixture weight $w_i$.

As noted, according to some embodiments, an MFI 430 assumes that means $\mu_i$, which may be used to represent the mean position distribution of the clusters in 3-dimensional Stokes space, follow a normal distribution, the covariance matrices $\Sigma_i$ follow a Wishart distribution, and the weights $w_i$, which may be used to represent the weights of the clusters in 3-dimensional space, follow a Dirichlet distribution. Therefore, in some embodiments, each parameter $w_i, \mu_i, \Sigma_i$ can be modeled by a probabilistic distribution.

In particular, in some embodiments, the normal distribution of the means $\mu_i$ may be given by:

$$N(\mu \mid m, \beta S) \sim \frac{1}{\sqrt{(2\pi)^d \det(\beta S)}} \exp\left[-\frac{1}{2}(\mu - m)^T (\beta S)^{-1}(\mu - m)\right] \quad (23)$$

where:

m is the hypermean of the mean distribution $\mu$;

$\beta$ is a scaling factor;

d=3: dimension of the table.

In some embodiments, the hypermean may be used to locate the mean position of each cluster in 3-dimensional space. Further, in some embodiments, the Wishart distribution of the covariance matrices $\Sigma_i$ may be given by:

$$W\left(\sum \mid \upsilon, S\right) \sim \frac{\det(S)^{-\frac{\upsilon}{2}} \det\left(\sum\right)^{\frac{(\upsilon-d-1)}{2}}}{2^{\frac{\upsilon d}{2}} \pi^{\frac{d(d-1)}{4}} \prod_{k=1}^{d} \Gamma\left(\frac{\upsilon+1-k}{2}\right)} \exp\left[-\frac{Tr\left(S^{-1}\sum\right)}{2}\right] \quad (24)$$

where:

$\upsilon$ are the degrees of freedom;

S is the hyper covariance matrix;

$\Gamma$ is the Gamma function.

Finally, in some embodiments, joint Dirichlet distribution of the mixing probabilities $w_i$ can be given by:

$$D(w|\lambda_1, \ldots, \lambda_N) = \frac{\Gamma\left(\sum_{j=1}^{N} \lambda_j\right)}{\prod_{j=1}^{N} \Gamma(\lambda_j)} \prod_{i=1}^{N} w_i^{\lambda_i-1} \quad (25)$$

where:

N is the number of mixtures;

$\lambda_1, \ldots, \lambda_N$ are the concentration parameters.

In some embodiments, these concentration parameters can be used to estimate the weight of each cluster in 3-dimensional space. Additionally, in some embodiments, Variational Bayesian methods can be applied to estimate the Gaussian mixture parameters' probabilistic distribution ($w_i$, $\mu_i$, $\Sigma_i$).

In some embodiments, once the Gaussian mixture parameters' probabilistic distributions have been identified, the MFI 430 may estimate the polarization states of transmission. As noted above, the polarization states of transmission (i.e., Jones vector) are contained in the normal of the least-square (LS) plane to the lens-like geometrical figure. To estimate the Jones vector (i.e., the polarization states of transmission), an MFI 430 may identify the polarization states of transmission in the Stokes space.

In some embodiments, an MFI 430 may employ a method that includes estimating the least-square (LS) plane fit of the data to identify and track the polarization states of the received signal. Put differently, an MFI 430 may generate a two-dimensional plane in Stokes space based on 3D points in Stokes space and identify a normal to that plane that goes through the origin of the plane. But, certain degenerated cases may exist that jeopardize the identification of the transmission's polarization states. Accordingly, in such instances, prior to using any statistical tool and making decisions on the modulation format, an MFI 430 may find reliable markers in the Stokes space to track the constellation rotation with time.

In some embodiments, an MFI 430 may employ a principal component analysis (PCA) method for estimating the two-dimensional linear plane P orthogonal to the polarization states of the received signal in order to find reliable markers in the Stokes space to track the constellation rotation with time. In some embodiments, the PCA method may utilize cluster parameters (e.g., mean location and weight) for estimating the two-dimensional plane. As will be appreciated, in Stokes space, projected clusters on plane P characteristically exhibit a maximized variance. Accordingly, by utilizing PCA, an MFI 430 may be able to search for the principal components that maximize the projected data variance. Further, because PCA is robust to noise variance, the plane Q spanned by the first two principal components typically enables the MFI 430 to better estimate the polarization states than the LS plane estimation.

Once the plane Q spanned by the first two principal components has been identified, the MFI 430 may estimate the dimension of the Stokes space constellation. Accordingly, in some embodiments, an MFI 430 employing Stokes space-based scheme using advanced statistical methods may detect the dimension of the Stokes space constellation. As will be appreciated, the study of theoretical noiseless Stokes space constellations leads to a natural distinction between 2-dimensional constellations that are wholly contained on a plane in Stokes space (e.g., OOK, M-PSK, M-PAM) and 3-dimensional constellations (e.g., M-QAM with M≠{2,4}). By assuming cluster distributions follow a Gaussian mixture model (GMM), an MFI 430 may identify 3-dimensional Stokes space clusters parameters (i.e., mean position $m_i$ and Dirichlet concentration parameter $\lambda_i$) via a variational learning method. In some embodiments, these estimated parameters can be used as a proxy for the mean position and weight, respectively, of each 3-dimensional cluster. Similar methods for estimating such parameters are discussed in C. M. Bishop, *Pattern recognition and Machine Learning*, Springer 3$^{rd}$ ed., 2006 and N. Nasios, et al., IEEE Trans. On Sys., Man, and Cybernetics—Part B, Vol. 36, No. 4, 2006.

In some embodiments, to detect the dimension of the Stokes space constellation, the MFI 430 may define a statistic that evaluates the weighted variance of the projected clusters' mean locations (i.e., mean position) on the straight line $Q^\perp$ orthogonal to the plane Q spanned by the first two principal components. The defined statistic may be represented as follows:

$$c = \Sigma_{cluster\ i} \alpha_i |<\vec{\mu}_i, \vec{s}>|^2 \quad (26)$$

where:

$\vec{s}$ is the unitary vector of $Q^\perp$;

$\vec{\mu}_i$ is the mean position of the $i^{th}$ cluster;

$\alpha_i$ ($=\lambda_i/\Sigma_i \lambda_i$) is the weight of the $i^{th}$ cluster.

Accordingly, for ideal noiseless Stokes space constellations (e.g., the constellations shown in FIG. 17), c=0 for OOK, M-PSK, and M-PAM. Further, c≠0 for M-QAM (M≠{2,4}). FIG. 8 contains a table of theoretical values for different modulation formats of the coefficient c.

Once the coefficient c has been estimated, and therefore the dimension of the Stokes space constellation has been detected, the MFI 430 may perform further processing to identify the modulation format, as will be described.

To discriminate between modulation formats within the 2-dimensional Stokes space constellations group (i.e., OOK, M-PSK, and M-PAM), an MFI 430 may employ a weighted HOS method on the 2-dimensional projection of the 3-dimensional Stokes space constellation. In some embodiments, 3-dimensional Stokes space data points are projected onto the plane Q spanned by the first two principal components. In some embodiments, and as was described in relation to estimating the weight and mean position of the cluster in 3-dimensional space, when processing the 2-dimensional projection of the constellation in 3-dimensional Stokes space, an MFI 430 may assume that (1) projected clusters' distributions follow a GMM; (2) projected clusters' means $\mu_{Q,i}$ follow a normal distribution; (3) projected clusters' covariance matrices $\Sigma_{Q,i}$ follow a Wishart distribution; and (4) projected clusters' weights $w_{Q,i}$ follow a Dirichlet distribution.

Therefore, in some embodiments, an MFI 430 can model each parameter $w_{Q,i}, \mu_{Q,i}, \Sigma_{Q,i}$ by a probabilistic distribution. Further, the MFI 430 can apply Variational Bayesian methods to estimate the Gaussian mixture parameters' probabilistic distribution ($w_{Q,i}, \mu_{Q,i}, \Sigma_{Q,i}$), and therefore extract the 2-dimensional projected clusters' parameters (mean position $m_{Q,i}$ and Dirichlet concentration parameter $\lambda_{Q,i}$). Accordingly, an MFI 430 may then utilize modified normalized estimates of the fourth order cumulants that take into account the detected clusters' weights (i.e., $\alpha_{Q,i} = \lambda_{Q,i}/\Sigma_i \lambda_{Q,i}$), which provide a reliable interpretation of the statistics of the distribution of the data projected in the Q plane.

In some embodiments, the MFI 430 may use the following modified normalized estimates of the fourth order cumulants:

$$\hat{C}_{2,0} = \sum_{cluster\ i} \lambda_{Q,i} m_{Q,i}^2 \quad (27)$$

$$\hat{C}_{2,1} = \Sigma_{cluster\ i} \lambda_{Q,i} |m_{Q,i}|^2 \quad (28)$$

$$\hat{C}_{4,k} = f(m_{Q,i}, \lambda_{Q,i}) \quad (29)$$

where:

f is a function inspired from conventional higher order cumulants.

Specifically, in some embodiments, the MFI 430 may use the following modified normalized estimates of the fourth-order cumulants:

$$\hat{C}_{2,0} = \Sigma_{cluster\ i} \lambda_{Q,i} m_{Q,i}^2 \quad (30)$$

$$\hat{C}_{2,1} = \Sigma_{cluster\ i} \lambda_{Q,i} |m_{Q,i}|^2 \quad (31)$$

$$\hat{C}_{4,0} = \Sigma_{cluster\ i} \lambda_{Q,i} m_{Q,i}^4 - 3\hat{C}_{2,0}^2 \quad (32)$$

$$\hat{C}_{4,1} = \Sigma_{cluster\ i} \lambda_{Q,i} \overline{m_{Q,i}} m_{Q,i}^3 - 3\hat{C}_{2,0}\hat{C}_{2,1} \quad (33)$$

$$\hat{C}_{4,2} = \Sigma_{cluster\ i} \lambda_{Q,i} |m_{Q,i}|^4 - |\hat{C}_{2,0}|^2 - 2|\hat{C}_{2,1}|^2 \quad (34)$$

Figure 9:
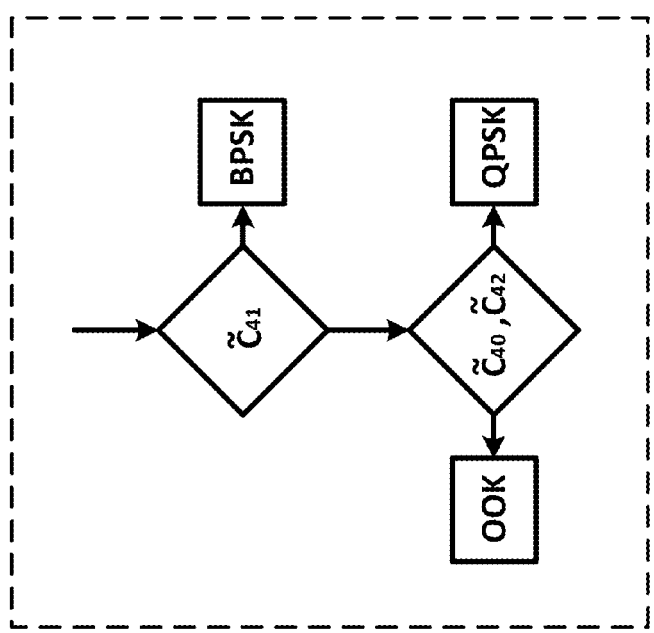
FIG. 9 illustrates a hierarchical structure for modulation format recognition using normalized fourth-order cumulants, according to an example embodiment

Once modified normalized estimates of the fourth-order cumulants have been evaluated, an MFI 430 may use a hierarchical classification scheme for recognition of the modulation format among OOK, M-PSK, and M-PAM formats. Accordingly, FIG. 9 illustrates a hierarchical approach that utilizes modified normalized fourth-order cumulants to recognize modulation formats (e.g., OOK, BPSK, and QPSK) from statistics of Stokes space constellations projected onto the 2-dimensional least-square plane, in some embodiments. FIG. 10 is a table containing theoretical normalized fourth-order cumulant values indicative of modulation format signatures among 2D Stokes space constellations.

Figures 11A, 11B, 11C:
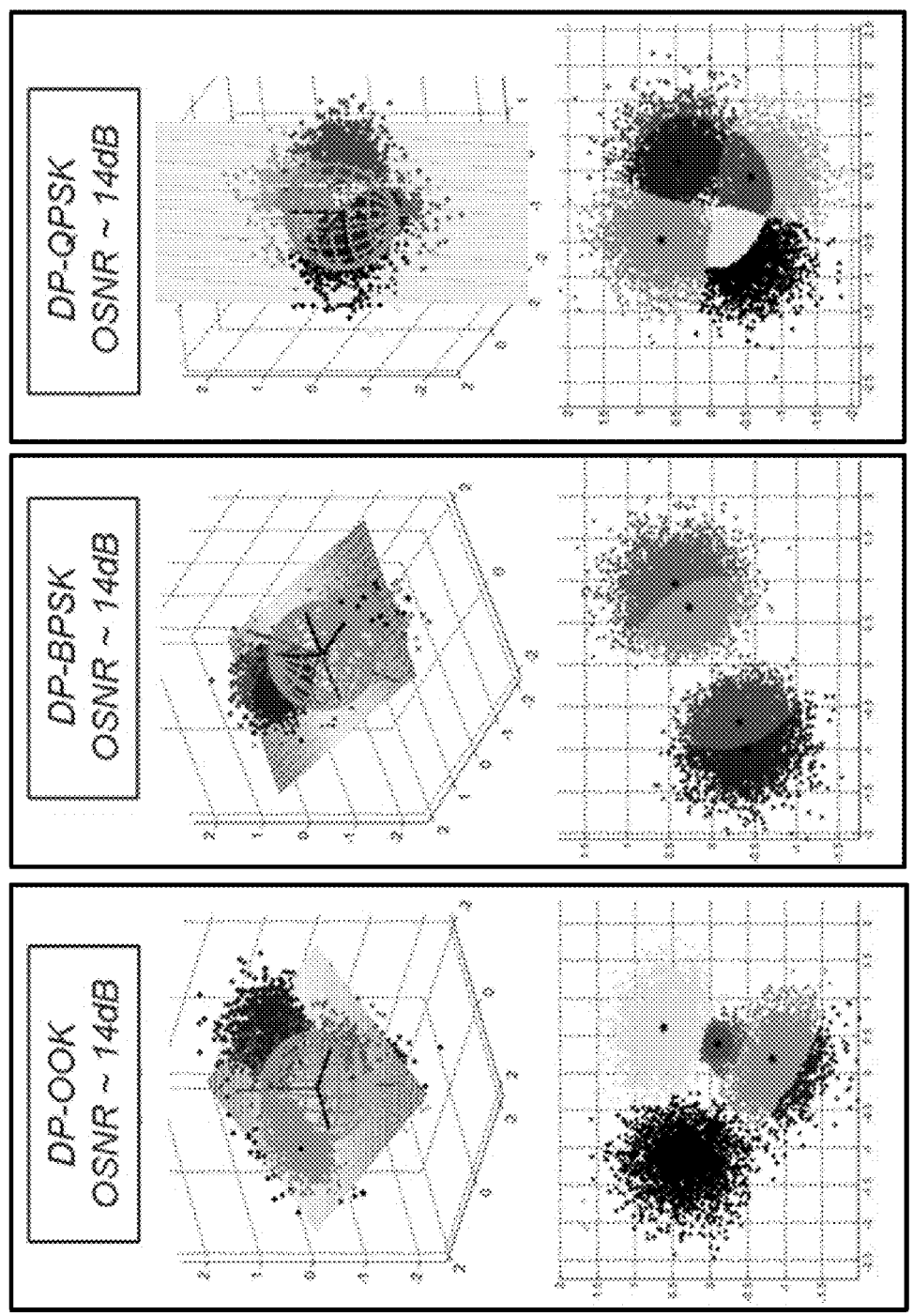
FIGS. 11A-C illustrate modulation format recognition among 2D Stokes space constellations using a system comprising an MFI configured to employ Stokes space-based modulation format recognition using advanced statistical methods.

FIGS. 11A-C illustrate modulation format recognition among 2D Stokes space constellations using a test system that utilizes an MFI 430 configured to employ Stokes space-based modulation format recognition using advanced statistical methods.

To discriminate between modulation formats within the 3-dimensional Stokes space constellations group (i.e. the M-QAM group where M≠{2,4}), the MFI 430 may perform further processing to identify the modulation format. Accordingly, in some embodiments, an MFI 430 may employ spatial statistics based on generalized cross-product statistics such as those discussed at A. Getis, *Perspectives on Spatial Data Analysis—Advances in Spatial Science*, Springer, 2010. As will be appreciated, generalized cross-product statistics are multidisciplinary tools used to evaluate spatial autocorrelation. Further, as will be understood by one of skill in the art, mapped data generally possesses autocorrelation properties whenever the mapped data exhibits an organized pattern. Put differently, spatial autocorrelation measures the correlation of a variable with itself in space. Accordingly, in some embodiments, an MFI 430 may evaluate the spatial correlation between the signal mapped into Stokes space and M-QAM-reference Stokes space constellations by defining a spatial correlation index. As will be understood, this spatial correlation index, $\Gamma_{XY}$, may be based on the deviation between two sets of spatial observations X and Y. Accordingly, an MFI 430 may use the following spatial correlation index:

$$\Gamma_{XY} = \sum\sum_{i,j} d_{i,j} \bigg/ \sum\sum_{i,j} \frac{1}{d_{i,j}} \quad (35)$$

where $d_{i,j}$ is the Euclidian distance between spatial observations $x_i \in X$ and $y_i \in Y$.

Specifically, an MFI 430 may use the following spatial correlation index:

$$\Gamma_{XY} = \frac{\sum\sum_{i,j} d_{i,j}}{\sum\sum_{i,j} \frac{1}{d_{i,j}}} \quad (36)$$

Figure 12:
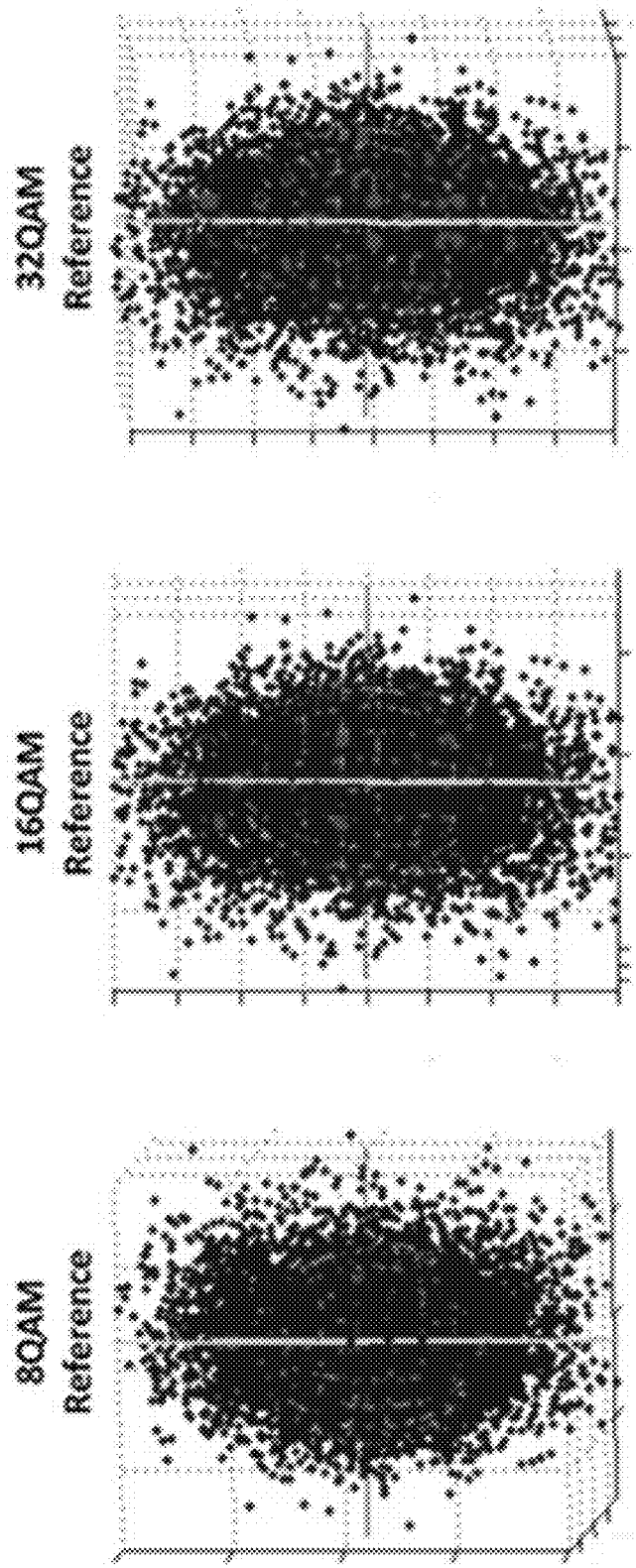
FIG. 12 illustrates modulation format recognition among 3D Stokes space constellations using a system comprising an MFI configured to employ Stokes space-based modulation format recognition using advanced statistical methods.
Figure 13:
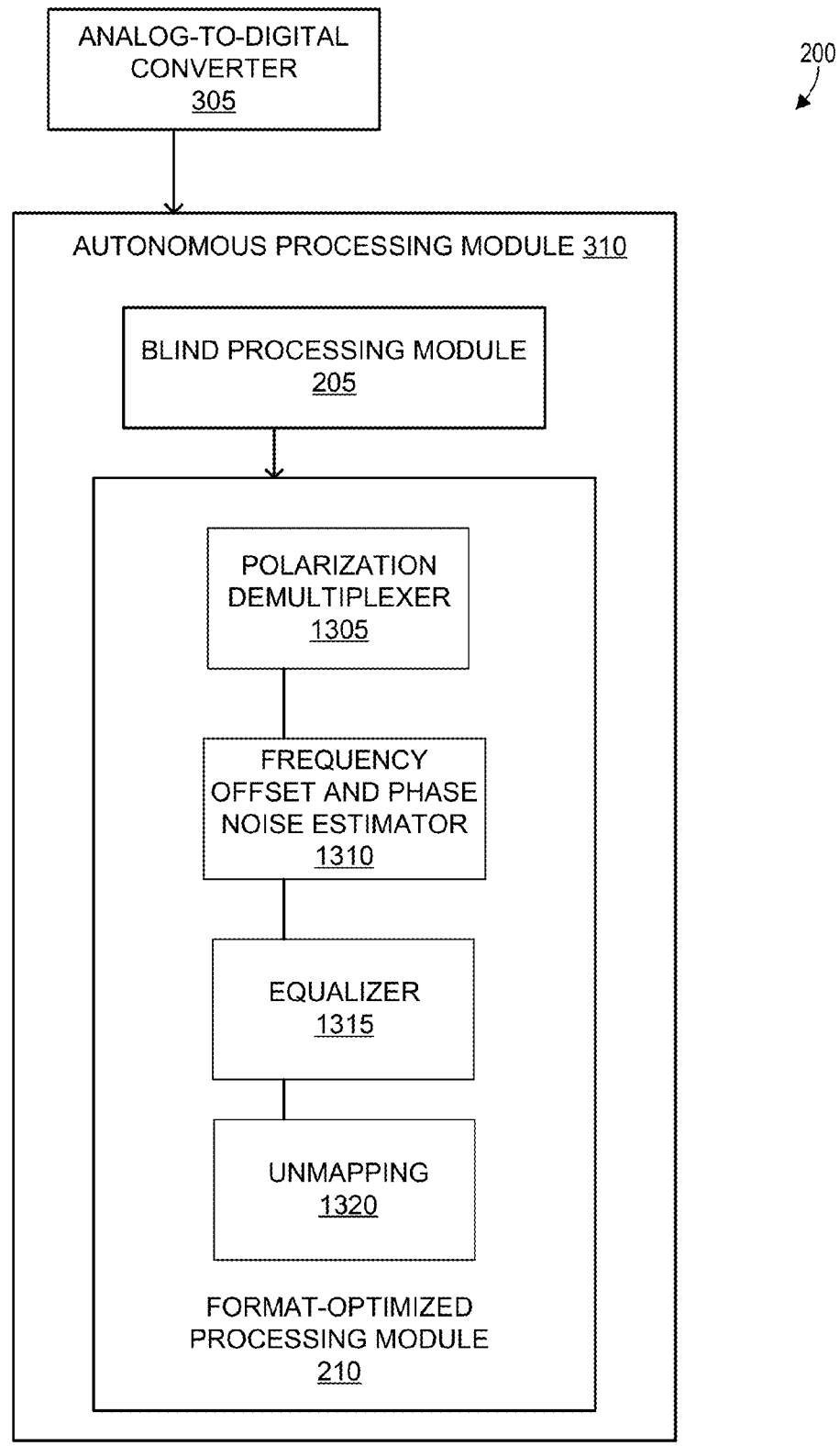
FIG. 13 is a block diagram of a format-optimized processing module 230, according to an example embodiment.

As will be understood, spatial observations X and Y are highly correlated as the spatial correlation index $\Gamma_{XY}$ tends to 0. Therefore, in some embodiments, the identification of the particular M-QAM format is given by the minimization of the normalized correlation indexes evaluated for different reference Stokes space constellations. Put differently, in some embodiments, the MFI 430 may utilize the normalized spatial correlation index as a series of confidence values, wherein each confidence value quantifies the likelihood that a considered modulation format matches the input signal modulation format. FIG. 12 illustrates modulation format recognition among 3D Stokes space constellations using a test system comprising an MFI 430 configured to employ Stokes space-based modulation format recognition using advanced statistical methods.

As discussed above, once an MFI 430 determines the modulation format, it may then optically demodulate the received signal, in some embodiments, as will be discussed.

Format-Optimized Processing Module:

In some embodiments, as shown in FIG. 3, an APM 310 may comprise a format-optimized processing module 210.

As shown in FIG. 7, a format-optimized processing module 310 may comprise a polarization demultiplexer 705, a frequency offset and phase noise estimator 710, an equalizer 715, and an unmapping module 720.

Polarization Demultiplexer

As shown in FIG. 7, a format-optimized processing module 210 may comprise a polarization demultiplexer 705. In some embodiments, for signals having QPSK and 16-QAM format, the polarization demultiplexer 705 may process the input signals with an independent component analysis (ICA) based polarization demultiplexing with natural gradient algorithm. Further discussion of similar methods can be found at S. Amari et. al., *Multichannel Blind Deconvolution and Equalization using Natural Gradient*, Signal Processing Advances in *Wireless Communications*, 1997 *First IEEE Signal Processing Workshop on*, vol., no., pp. 101-104, 16-18 Apr. 1997. Alternatively, for OOK and BPSK input signals, a polarization demultiplexer 705 may employ a CMA based polarization demultiplexing algorithm, as discussed above.

Frequency Offset and Phase Noise Estimator

In some embodiments, after polarization demultiplexing, a frequency offset and phase noise estimator (FOPNE) 710 may further process the input signal by performing both frequency offset estimation (as described above) and carrier phase recovery. As previously discussed, the transmitter and receiver (LO) lasers generally are not frequency locked, which leads to a residual frequency offset component $\Delta\omega$ in the input signal phase. As will be understood by one of skill in the art, this residual frequency offset component may cause the signal constellation in each polarization to rotate over time. Accordingly, in one embodiment, an FOPNE 710 processes the signal to reduce this rotation. As discussed previously, in one embodiment, the FOPNE 710 exploits the fast Fourier transform of the received signal raised to the fourth power so that the frequency offset between the transmitter and the LO laser can be estimated and removed.

To remove carrier phase components (i.e., $\phi_x[k]$ and $\phi_y[k]$) in the X and Y polarizations, a FOPNE 710 may employ a carrier phase recovery algorithm. For example, in one embodiment, the FOPNE 710 may employ a stop-and-go decision-directed algorithm. Further discussion of a similar process may be found at G. Picchi and G. Prati, *Blind Equalization and Carrier Recovery Using a 'Stop-and-Go' Decision Directed Algorithm*, IEEE Trans. On Comm., Col. COM-35, No. 9, September 1987. In some embodiments, such an algorithm may employ a decision-directed recovery loop to estimate the carrier phase. In some embodiments, the tracking phase equation can be given by:

$$\begin{cases} \phi_x[k+1] = \phi_x[k] - \mu \, \text{Im}\{x[k]\overline{e_x}[k]\} \\ \phi_y[k+1] = \phi_y[k] - \mu \, \text{Im}\{y[k]\overline{e_y}[k]\} \end{cases} \quad (27)$$

where:

$$e_x[k] = x[k] - a[k] \quad (28)$$

with:

a[k] the decision.

As will be appreciated, such an algorithm effectively tracks the carrier phase instead of estimating it over a block of symbols, as in the case of the Viterbi-Viterbi algorithm described above. Further, the step-size parameter μ enables control of the tracking speed of the carrier phase.

Equalizer

In one embodiment, an equalizer 715 performs an equalization process on the signal. To correct for intersymbol interferences (ISI), the equalizer 715 may adjust the complex frequency response of the channel to minimize the ISI and other channel impairments, for example, by employing a least mean squares (LMS) based decision-directed equalizer and residual channel effects, which are applied to the received signal per polarization.

Unmanning Module

In some embodiments, an unmapping module 720 can recover bits from decoded symbols.
Verification of Embodiments:
Exemplary embodiments of architectures comprising an MFI 430 employing disclosed processing methods for determining a signal's modulation format are disclosed herein to demonstrate that the architectures' proficiency in autonomously determining and decoding received signals.

Hybrid Modulation Format Recognition

Figure 14:
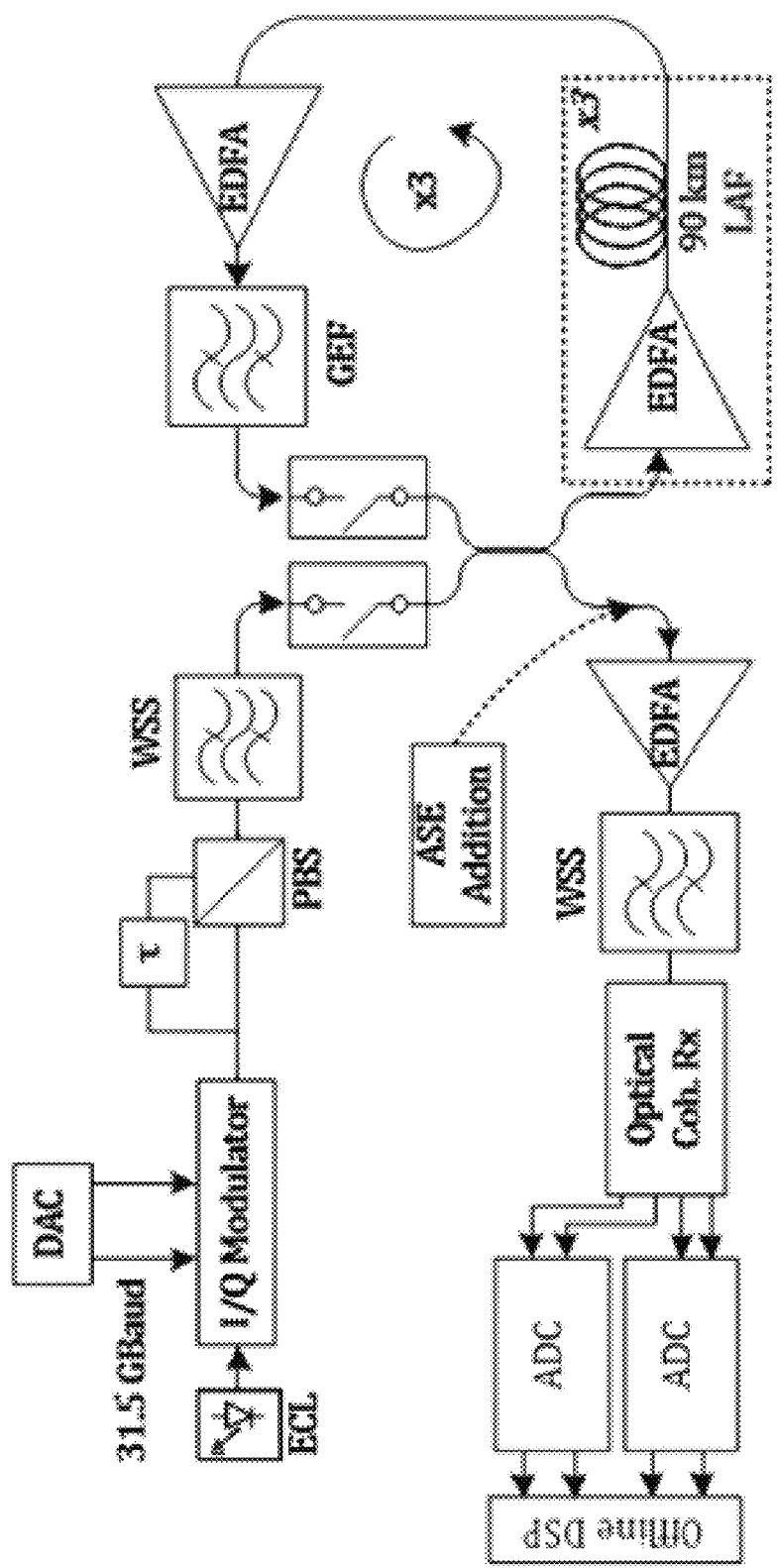
FIG. 14 is a schematic block diagram of an experimental network configuration for determining signal modulation format and demonstrating APM accuracy, according to an example embodiment.

FIG. 14 is an exemplary architecture of a test system comprising an MFI configured to employ determine a signal's time-domain hybrid modulation format and to demonstrate the accuracy of the configuration. The experimental configuration consists of a single-channel dual-polarization system transported at 1550.92 nm with 50 GHz optical filters at the transmitter and receiver, an EDFA-based recirculating loop comprising three 90 km LAF spans, and a coherent optical receiver and two synchronized ADCs sampling at 80 GSa/s. Further, the experimental configuration utilizes a 64 GSa/s high-speed DAC to generate 31.5 GBaud electrical TDHMF signals driving an I/Q modulator. In the exemplary embodiment, the transmitter is configured for seven different TDHMFs composed with BPSK, QPSK, 8QAM & 16QAM.

Figure 15:
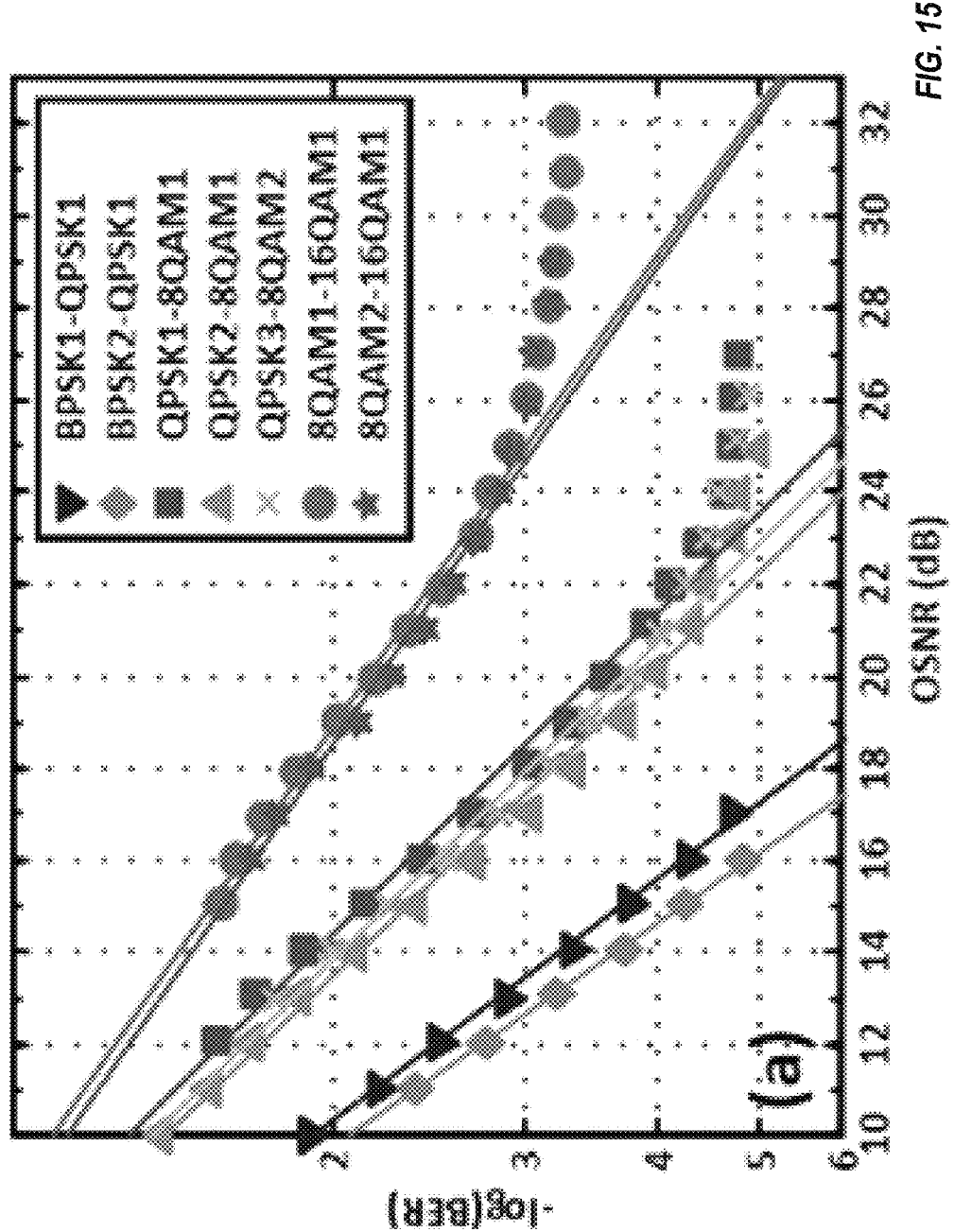
FIGS. 15 and 16 illustrate BER vs. OSNR performance results of various hybrid modulation formats after blind reception, baud rate estimation, format recognition/identification, and optimized processing, according to an example embodiment.
Figure 16:
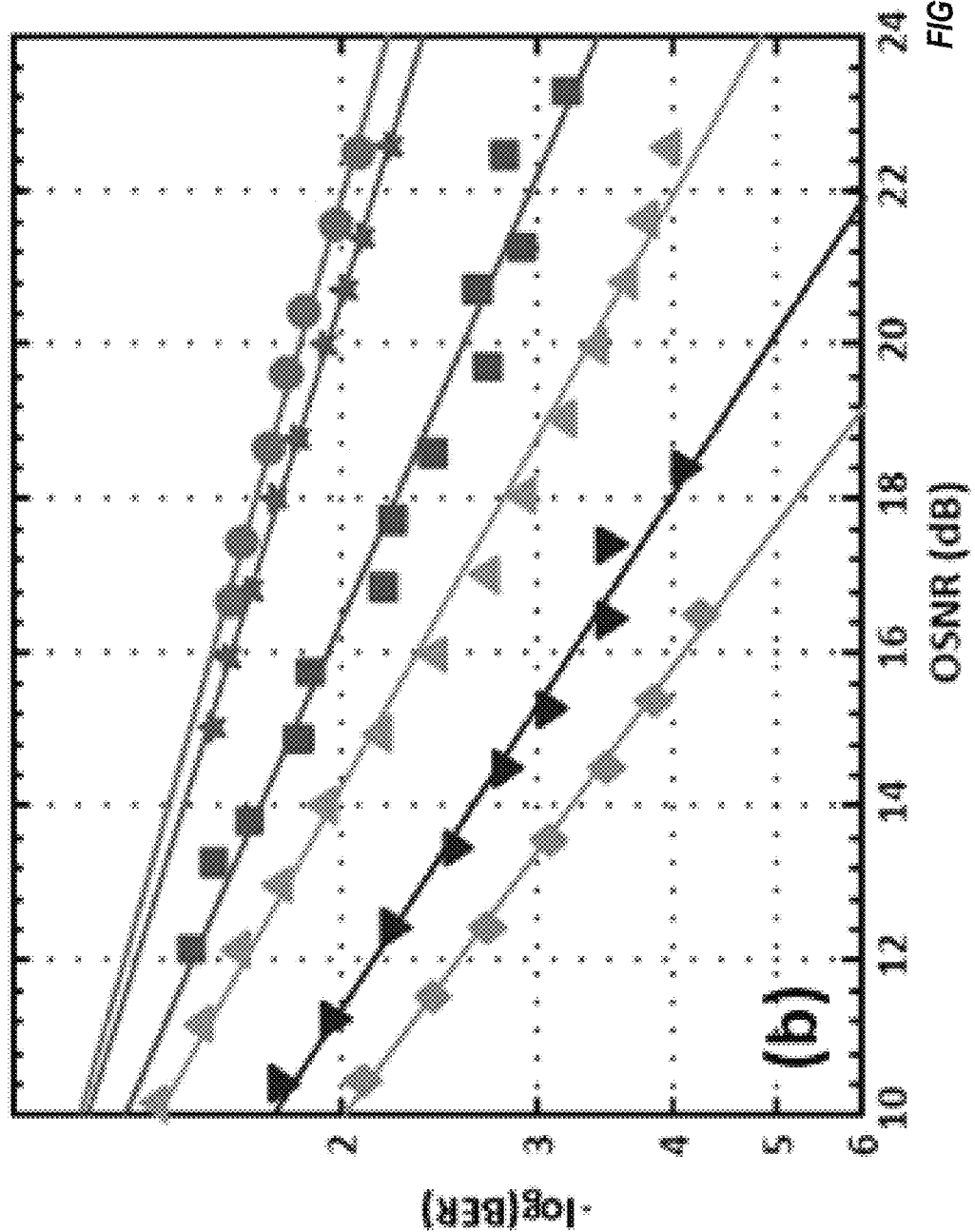
Figure 17:
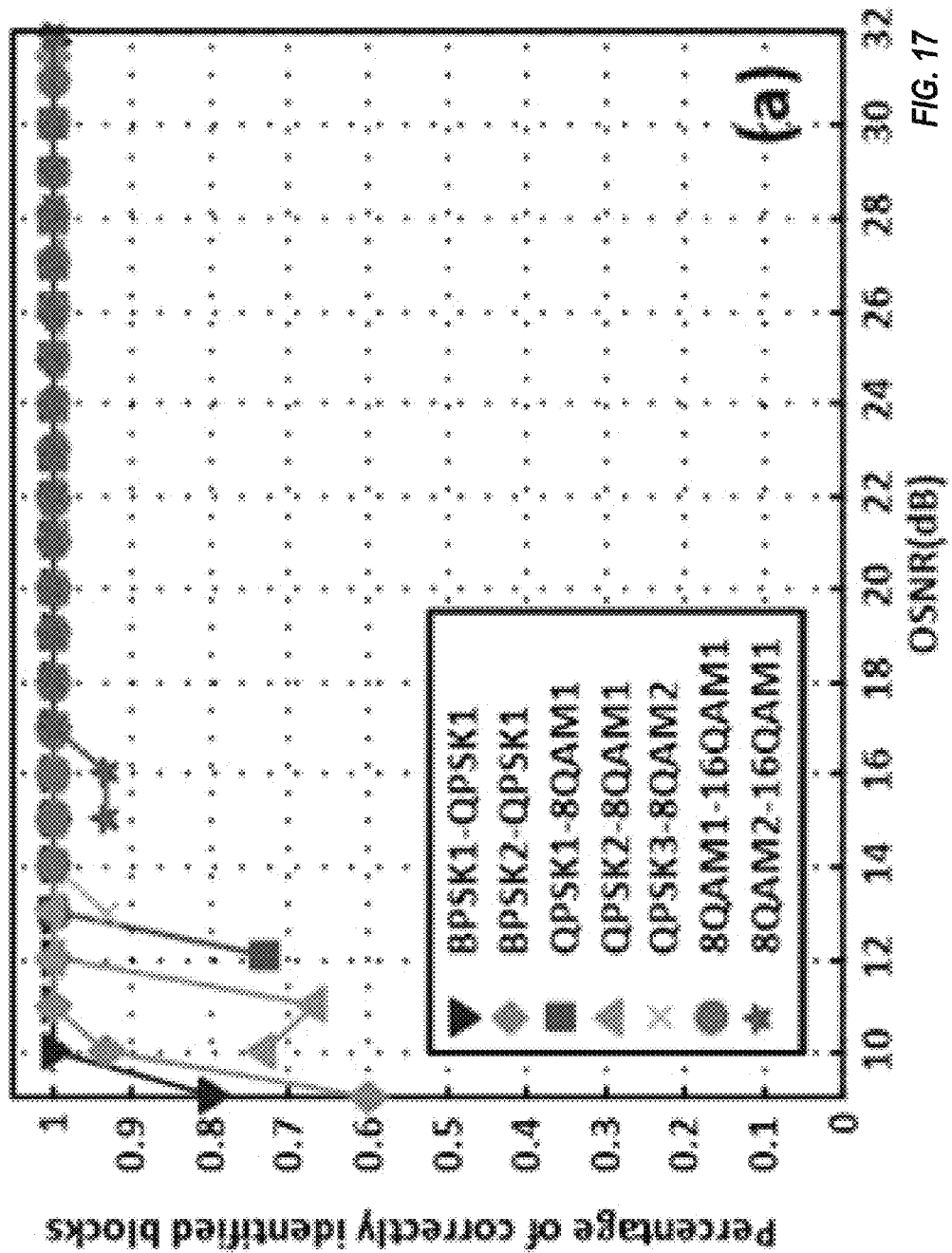
FIGS. 17 and 18 illustrate classification success of a TDHFM recognition module, according to an example embodiment.
Figure 18:
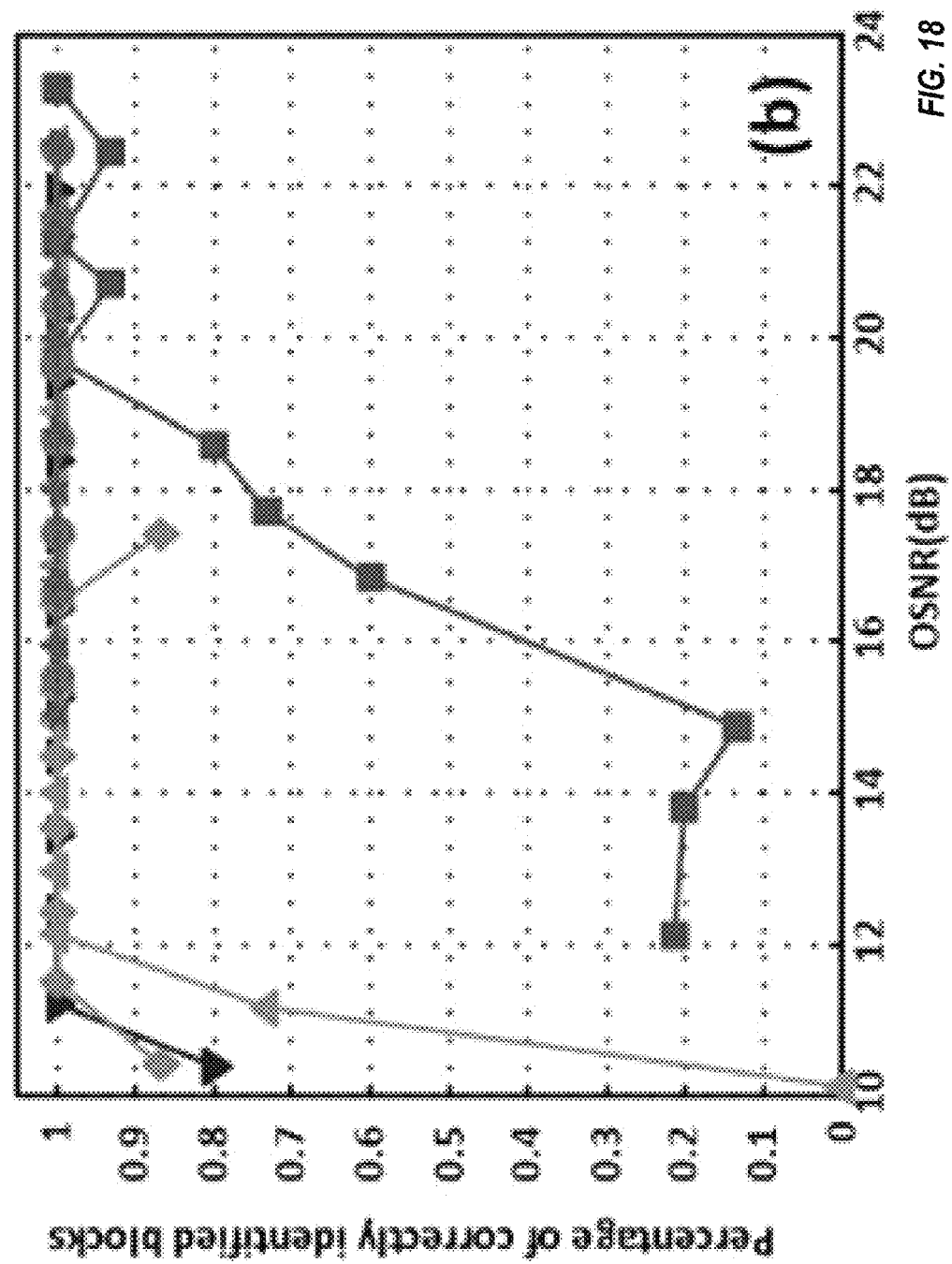

Using the configuration as shown in FIG. 8, the BER vs. OSNR performance of the architecture of the architecture was evaluated before transmission (back-to-back configuration) for the seven test hybrid modulation formats, and the results are shown in FIGS. 15 and 16. The FIGS. 15 and 16 results illustrate the BER vs. OSNR performance of the various hybrid modulation format signals after blind reception, baud rate estimation, format recognition/identification, and optimized processing in a back-to-back configuration (shown in FIG. 15) and after transmission in 810 km in LAF with 0 dBm launch power (shown in FIG. 16), as discussed above. FIGS. 17 and 18 illustrate classification success of a TDHFM recognition module 220 (or MFI 430) according to various embodiments of the disclosed technology. FIG. 17 illustrates classification performance in the back-to-back, and FIG. 18 illustrates classification performance after 810 km transmission.

Stokes Space-Based Modulation Format Recognition Using Advanced Statistical Methods An experimental optical network was likewise designed to evaluate the robustness of an architecture comprising an MFI 430 configured to employ a Stokes space-based modulation format recognition using advanced statistical methods. The experimental configuration comprises a single-channel system transported at 1550.92 nm with 50 GHz optical filters at the transmitter and receiver, an EDFA-amplified recirculating loop made of three 88-km large-area fiber (LAF) spans, a coherent optical receiver and two synchronized analog-to-digital converters (ADC) digitizing waveforms at 80 GSa/s. Signals are acquired after four loops for a total transmission distance of 1056 km. Classification performance vs. OSNR was quantified for the architecture in the back-to-back and after 1056 km transmission (0 or +6 dBm launch power) for OOK, BPSK, QPSK, and 16-QAM formats at 16 or 32 GBaud. At a given OSNR, the probability of recognition for a format was determined by examining 15 waveforms comprising 130,000 samples each.

Figure 19:
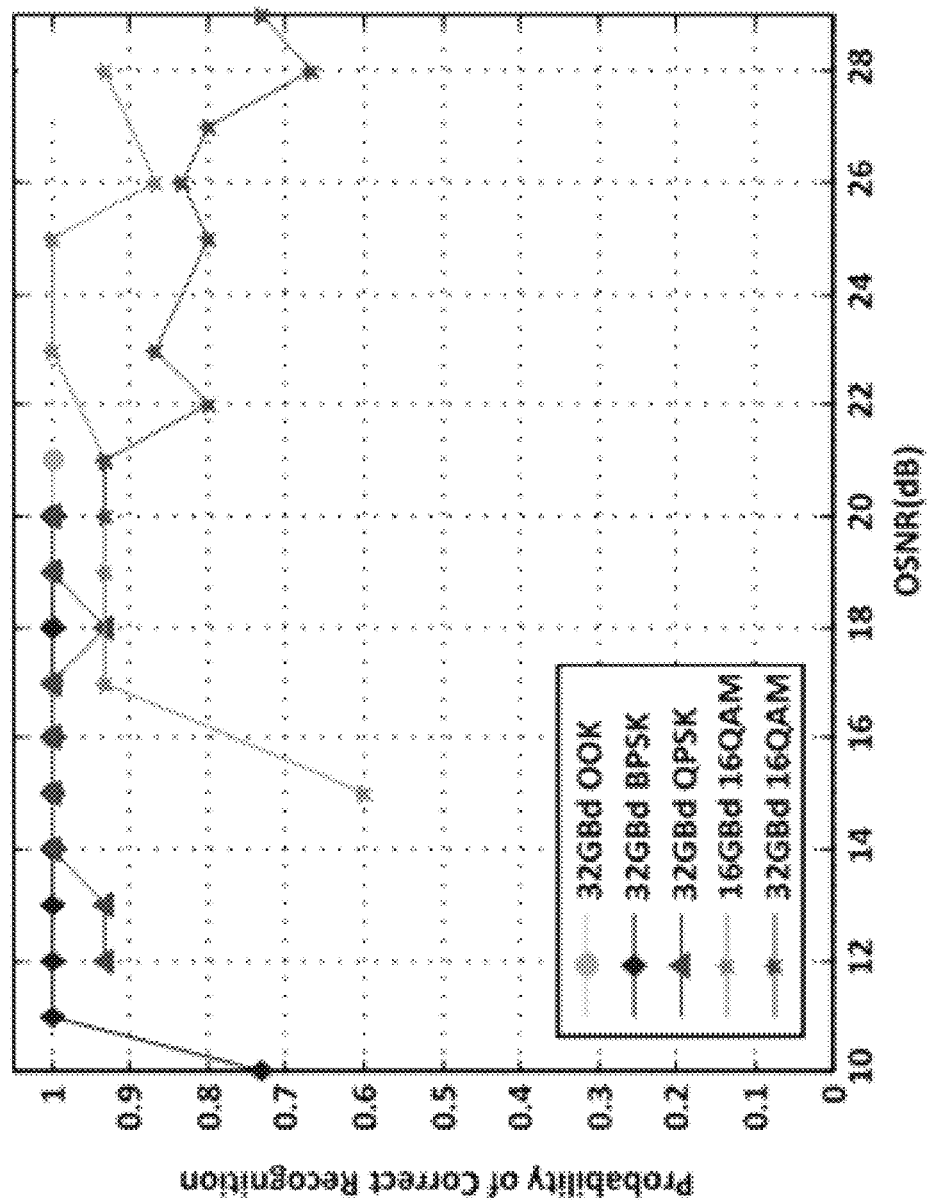
FIG. 19 illustrates classification performance vs. OSNR of various modulation formats for a test system comprising an MFI configured to employ Stokes space-based modulation format recognition using advanced statistical methods, in a back-to-back configuration, according to an example embodiment.
Figure 20:
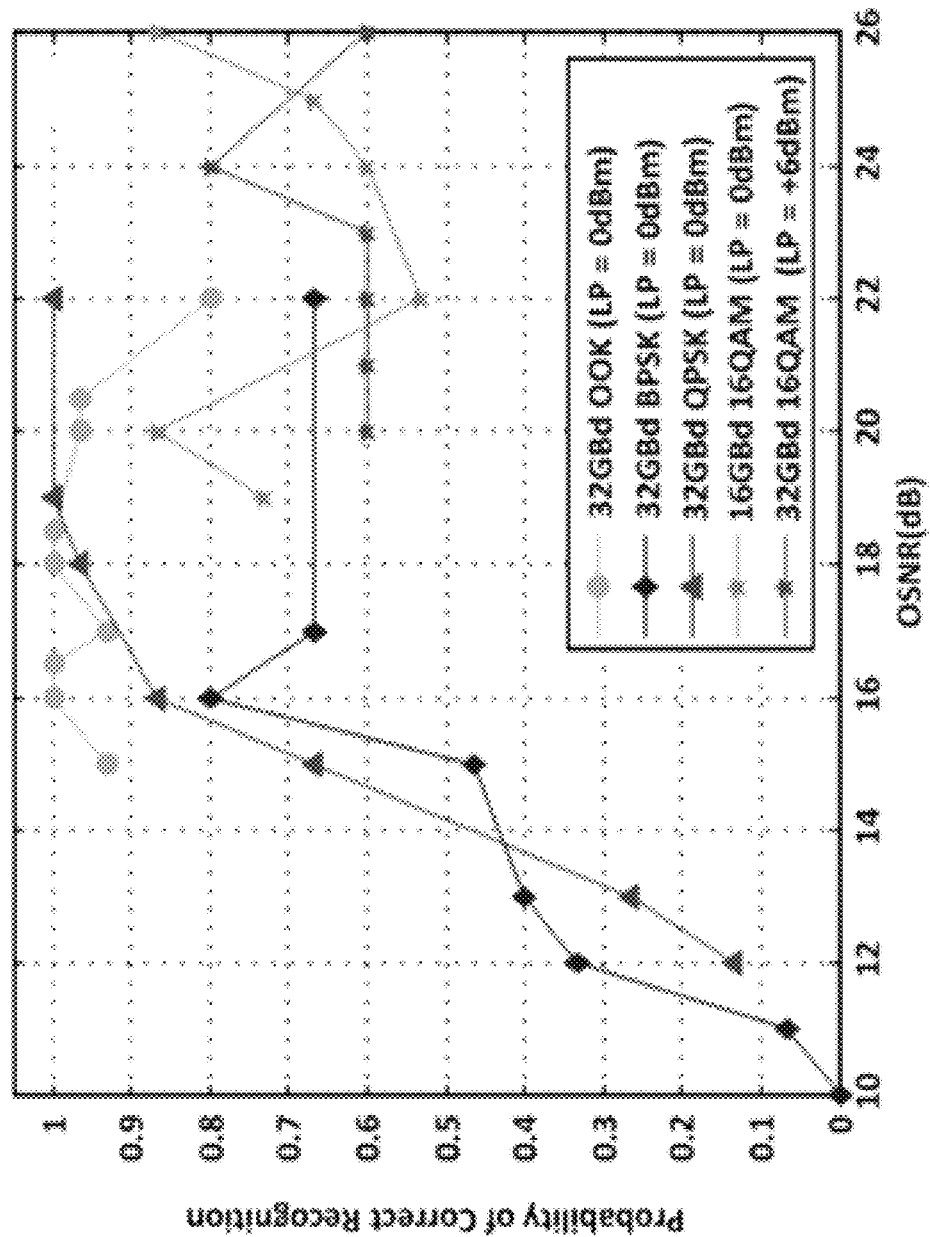
FIG. 20 illustrates classification performance vs. OSNR of various modulation formats for a test system comprising an MFI configured to employ Stokes space-based modulation format recognition using advanced statistical methods, after 1056 km transmission for varying launch powers, according to an example embodiment.

As shown in FIG. 19, the classification performance for the Stokes space-based format recognition using hierarchical classification based on advanced statistical methods is excellent in a back-to-back configuration. As shown in FIG. 19, for the large range of investigated OSNR, correct format recognition probabilities are typically above 60%. Further, as shown in FIG. 20, after 1056 km transmission in LAF, the architecture recognizes high OSNR signals. Further, once the formats are identified, the signals are demodulated with a BER performance indistinguishable from an omniscient receiver with maximum foreknowledge of the signal's parameters.

Figure 21:
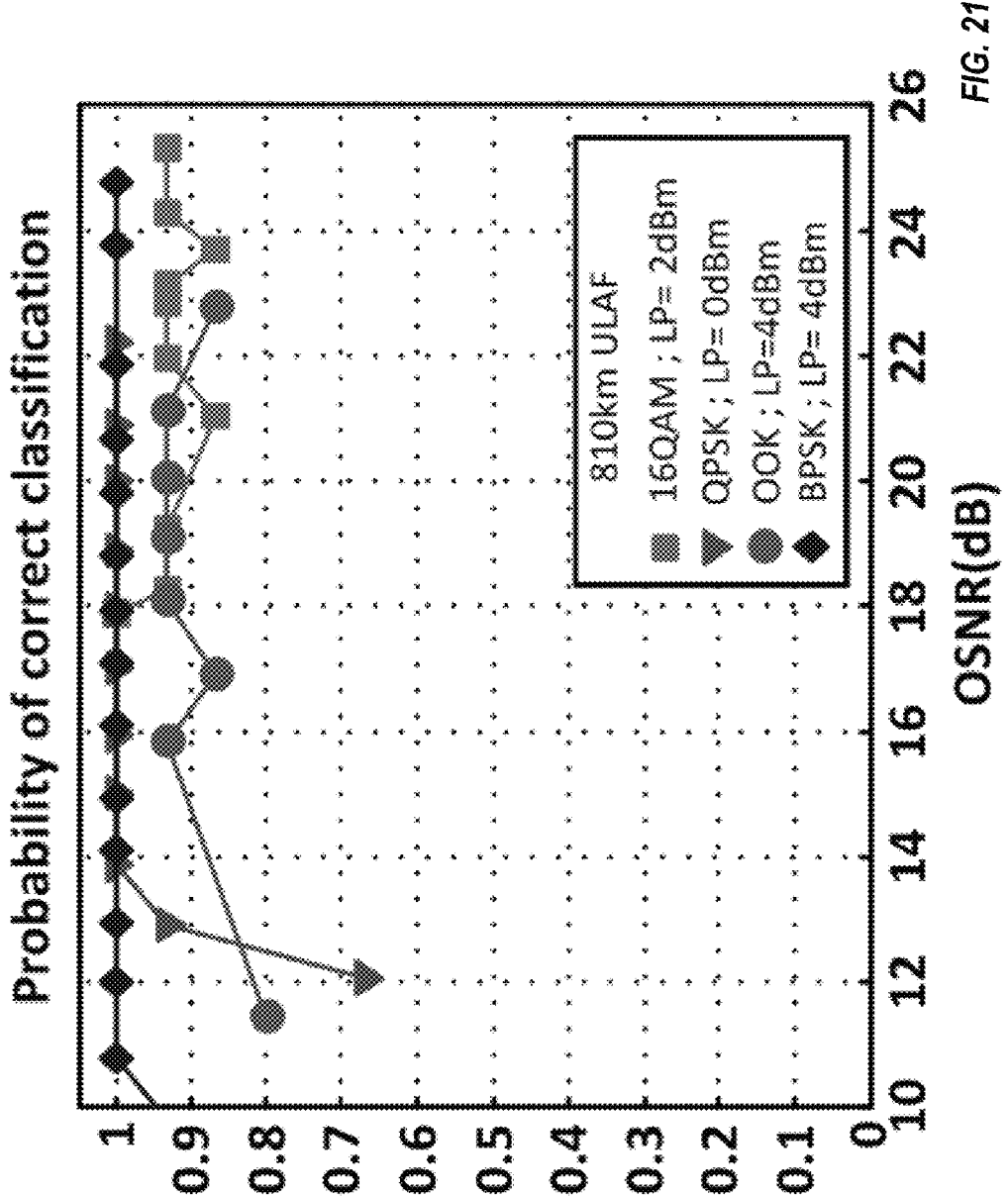
FIG. 21 illustrates classification performance vs. OSNR of various modulation formats for a test system comprising an MFI configured to employ Stokes space-based modulation format recognition using advanced statistical methods, after 810 km transmission for varying launch powers, according to one embodiment.

FIG. 21 illustrates classification performance vs. OSNR of various modulation formats for a test system comprising an MFI 330 configured to employ Stokes space-based modulation format recognition using advanced statistical methods, after 810 km transmission in LAF for varying launch powers, according to one embodiment.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person of ordinary skill to practice certain embodiments of the disclosed technology, including making and using any devices or systems and performing any incorporated methods. The patentable scope of certain embodiments of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A method for autonomously determining the modulation format of an input signal, the method comprising:
   estimating the input signal's frame length to determine if the input signal's modulation format is conventional or time-domain hybrid;
   responsive to determining the modulation format is time-domain hybrid, identifying a plurality of modulation formats that compose the input signal's frame;
   determining, based on the identified plurality of modulation formats, a ratio of a first modulation format to a second modulation format; and
   determining, based at least in part on the plurality of modulation formats, the ratio, and the frame length, a pattern arrangement of the plurality of modulation formats in time.

2. The method of claim 1, wherein prior to estimating the input signal's frame length the method further comprises:
   determining the input signal's baud rate;
   responsive to determining the baud rate of the input signal, estimating the input signal's chromatic dispersion (CD);
   compensating, based at least in part on the estimation of the input signal's CD, the input signal's CD to generate a CD-compensated signal;
   processing the CD-compensated signal to determine a number of multiplexed polarizations of the input signal; and
   performing timing recovery on the CD-compensated signal to generate a timing-recovered signal representative of the input signal.

3. The method of claim 1, wherein identifying the plurality of modulation formats that compose the input signal's frame and determining the ratio of the first modulation format to the second modulation format is based, at least in part, on the input signal's symbol radius probability density function.

4. The method of claim 1, wherein prior to determining the pattern arrangement of the plurality of modulation formats in time, the method further comprises:
   generating, based at least in part on the plurality of modulation formats, the ratio, and the frame length, a plurality of reference signals having the frame length and comprising the plurality of modulation formats in the ratio.

5. The method of claim 4 further comprising:
   comparing higher-order statistics of the input signal to each of the reference signals; and
   selecting, from the plurality of reference signals, a particular reference signal in which a first error criterion between higher-order statistics of the particular reference signal and higher-order statistics of the input signal is lower than a second error criterion between higher-order statistics of the input signal and higher-order statistics of any remaining reference signal.

6. A method for autonomously determining the modulation format of an input signal, the method comprising:
   estimating the input signal's frame length to determine if the input signal's modulation format is conventional or time-domain hybrid;
   responsive to estimating the input signal's frame length, performing polarization scrambling mitigation on the input signal to generate a plurality of polarization demultiplexed signals, each of the plurality of polarization demultiplexed signals having a frame length equal to the estimated frame length of the input signal;
   responsive to determining the modulation format is time-domain hybrid, identifying a plurality of modulation formats that compose at least one of the plurality of polarization demultiplexed signals' frames;
   determining, based on the identified plurality of modulation formats, a ratio of a first modulation format to a second modulation format; and
   estimating, based at least in part on the ratio, a pattern arrangement of the plurality of modulation formats in time, the estimated pattern arrangement representative of a pattern arrangement of a frame of the input signal.

7. The method of claim 6 further comprising:
   estimating a frequency offset of each of the plurality of polarization demultiplexed signals;
   responsive to estimating the frequency offset of each of the plurality of polarization demultiplexed signals, removing, from each of the plurality of polarization demultiplexed signals, the estimated phase offset to generate a plurality of frequency-offset-compensated signals;
   estimating a phase offset of each of the plurality of frequency-offset-compensated signals;
   responsive to estimating the phase offset of each of the plurality of frequency-offset-compensated signals, removing, from each of the plurality of frequencyoffset-compensated signals, the estimated phase offset to generate a plurality of phase-noise-compensated signals; and determining, based at least in part on the plurality of phase-noise compensated signals, a pattern arrangement of the input signal.

8. The method of claim 6, wherein prior to estimating the input signal's frame length the method further comprises:

determining the input signal's baud rate;

responsive to determining the baud rate of the input signal, estimating the input signal's chromatic dispersion (CD);

compensating, based at least in part on the estimation of the input signal's CD, the input signal's CD to generate a CD-compensated signal;

processing the CD-compensated signal to determine a number of multiplexed polarizations of the input signal; and performing timing recovery on the CD-compensated signal to generate a timing-recovered signal.

9. A method for autonomously determining the modulation format of an input signal, the method comprising:

determining the input signal's baud rate;

responsive to determining the baud rate of the input signal, estimating the input signal's chromatic dispersion (CD);

compensating, based at least in part on the estimation of the input signal's CD, the input signal's CD to generate a CD-compensated signal;

processing the CD-compensated signal to determine a number of multiplexed polarizations of the input signal;

performing timing recovery on the CD-compensated signal to generate a timing-recovered signal representative of the input signal;

estimating the input signal's frame length to determine if the input signal's modulation format is conventional or time-domain hybrid;

responsive to determining the modulation format is time-domain hybrid, identifying a plurality of modulation formats that compose the input signal's frame;

determining, based on the identified plurality of modulation formats composing the input signal's frame, a ratio of a first modulation format to a second modulation format;

generating, based at least in part on the plurality of modulation formats composing the input signal's frame, the ratio, and the input signal's frame length, a plurality of reference signals having the same frame length and comprising the same plurality of modulation formats that compose the input signal's frame, in the same ratio;

comparing higher-order statistics of the input signal to each of the reference signals; and selecting, from the plurality of reference signals, a particular reference signal in which a first error criterion based on higher-order statistics of the particular reference signal and higher-order statistics of the input signal is lower than a second error criterion based on the higher-order statistics of the input signal and higher-order statistics of any remaining reference signal.

* * * * *